Nov. 3, 1964
C. R. PELTON
3,154,855
APPARATUS FOR PLOTTING SEISMIC DATA
Filed Jan. 16, 1962
8 Sheets-Sheet 1
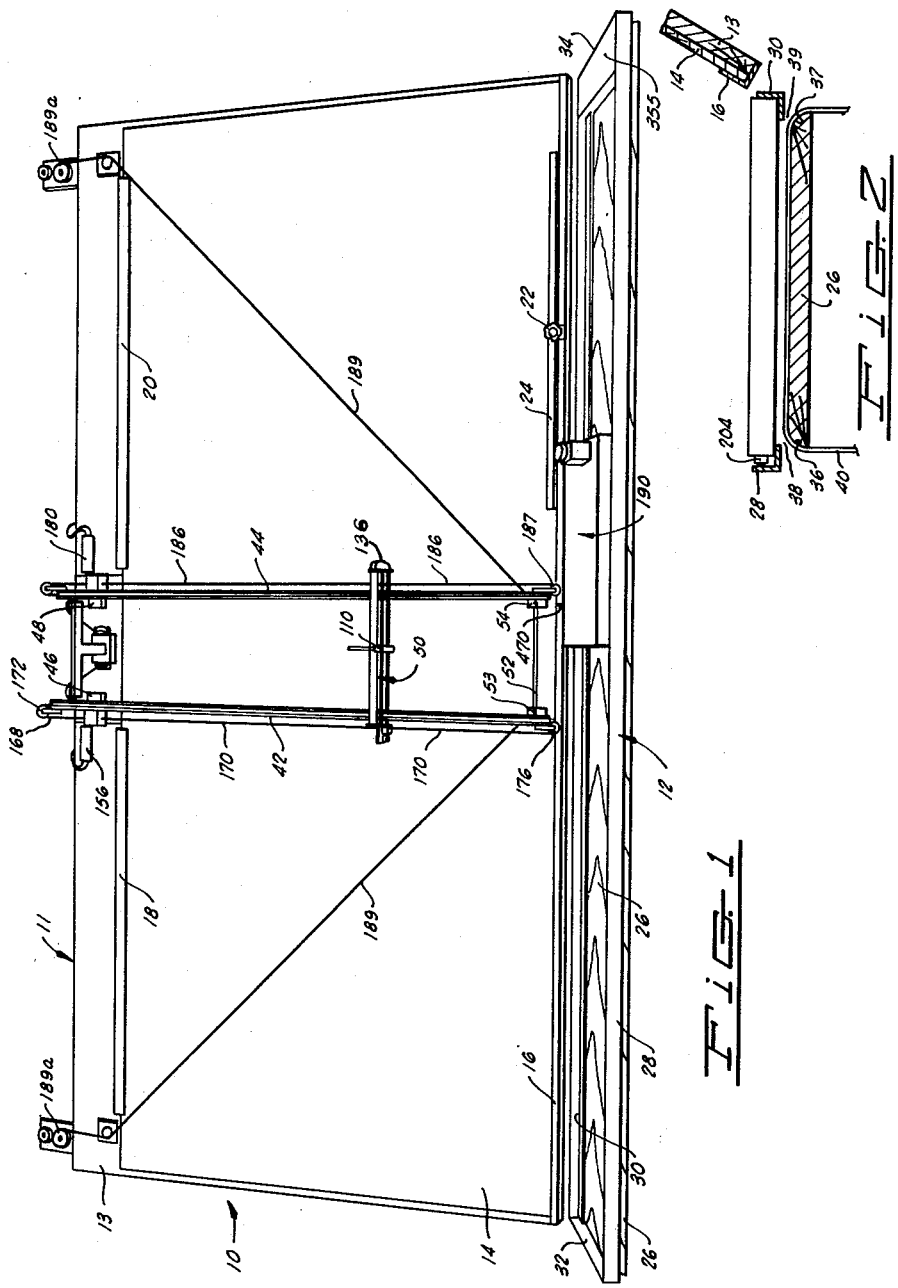
INVENTOR.
CHARLES R. PELTON
BY Nov. 3, 1964  C. R. PELTON  3,154,855
APPARATUS FOR PLOTTING SEISMIC DATA
Filed Jan. 16, 1962  8 Sheets-Sheet 2
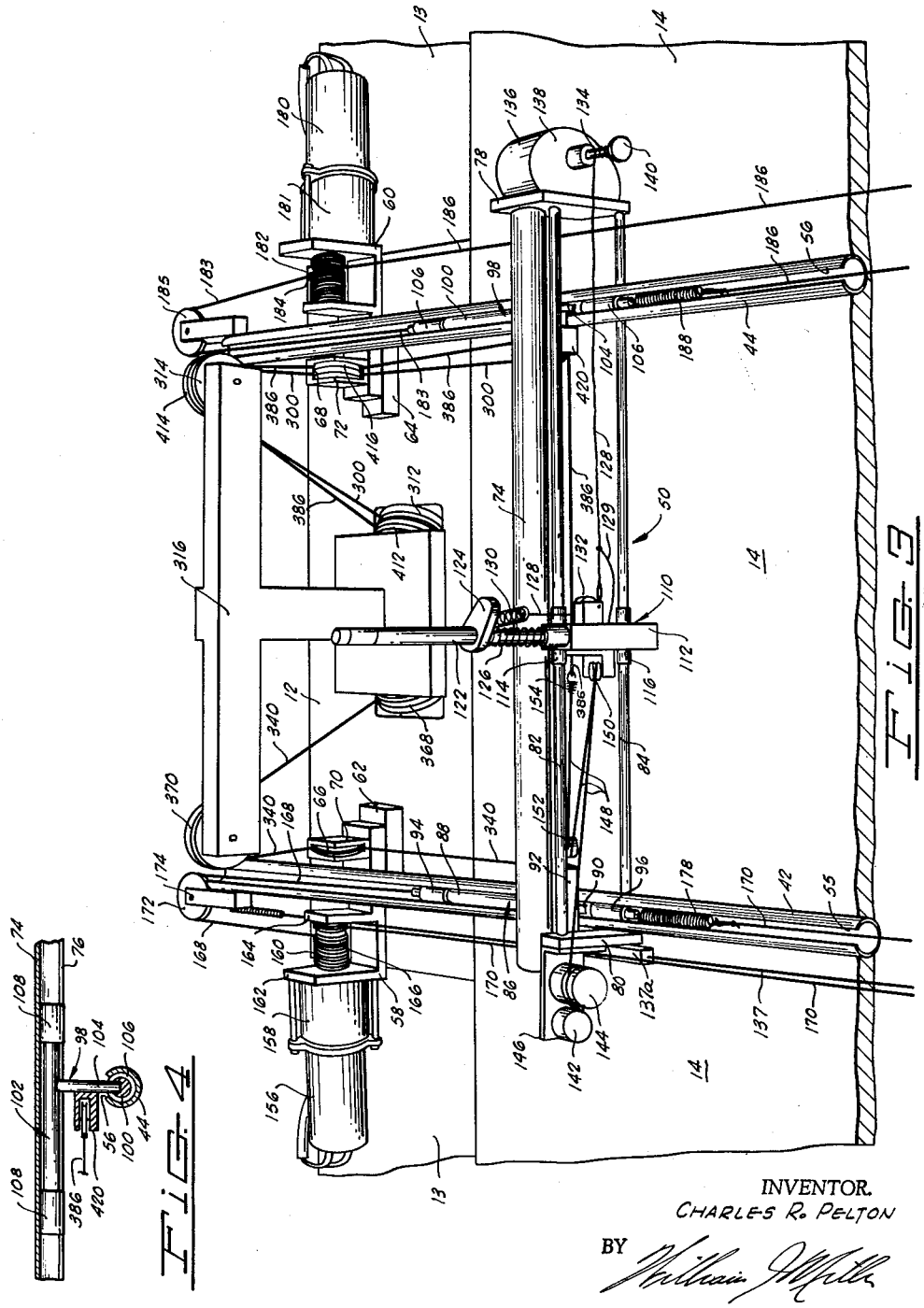
INVENTOR.
CHARLES R. PELTON
BY

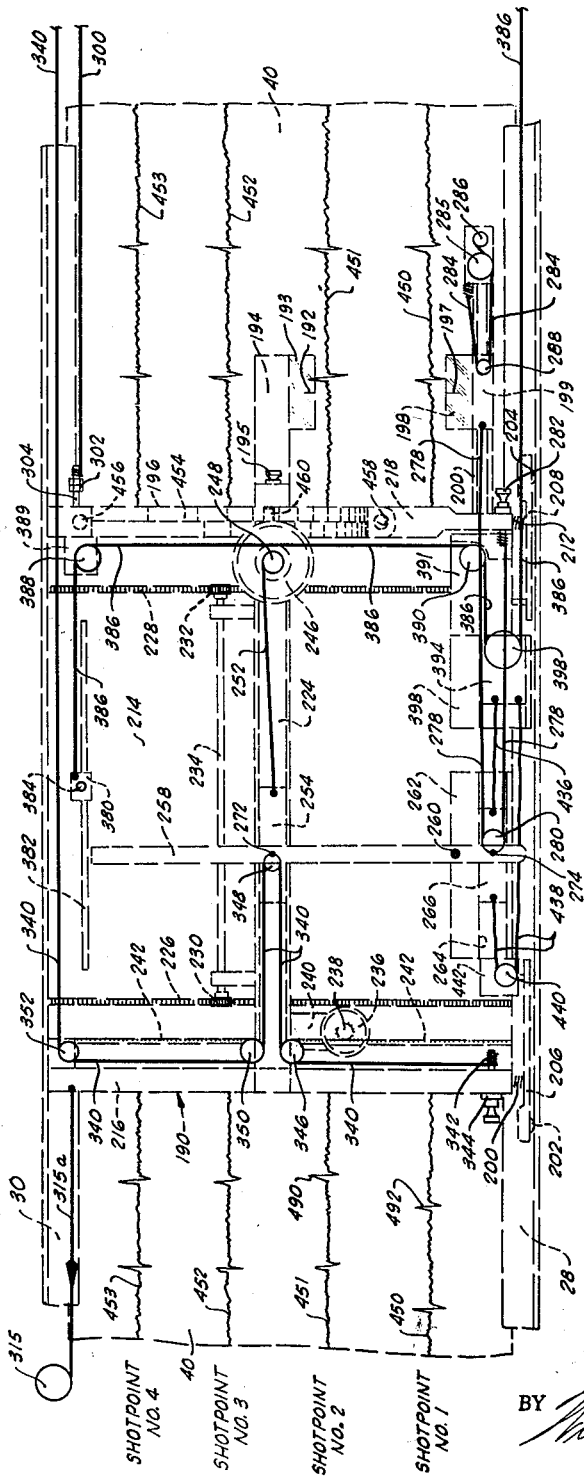

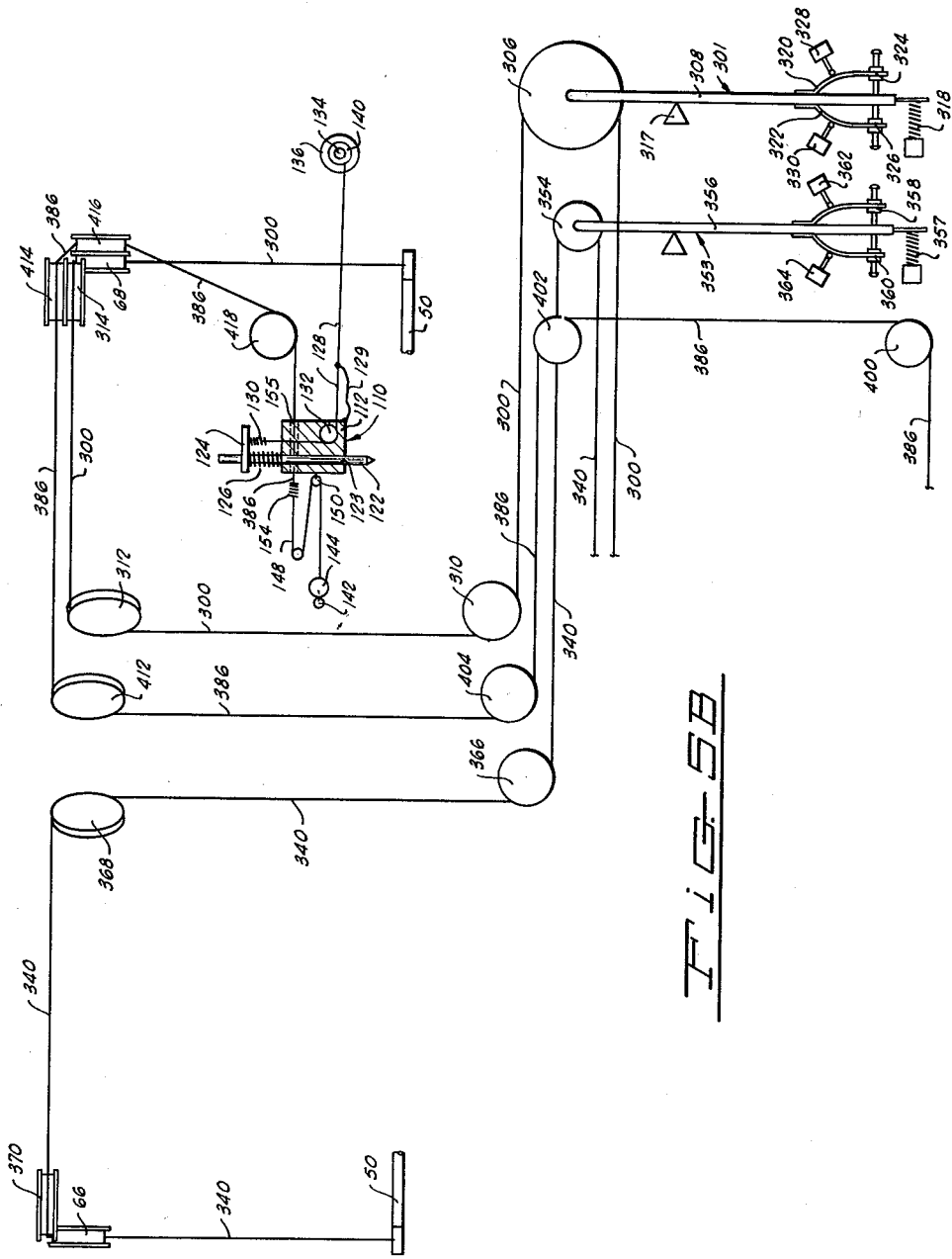

Nov. 3, 1964 C. R. PELTON 3,154,855
APPARATUS FOR PLOTTING SEISMIC DATA
Filed Jan. 16, 1962 8 Sheets-Sheet 5

INVENTOR.
CHARLES R. PELTON
BY

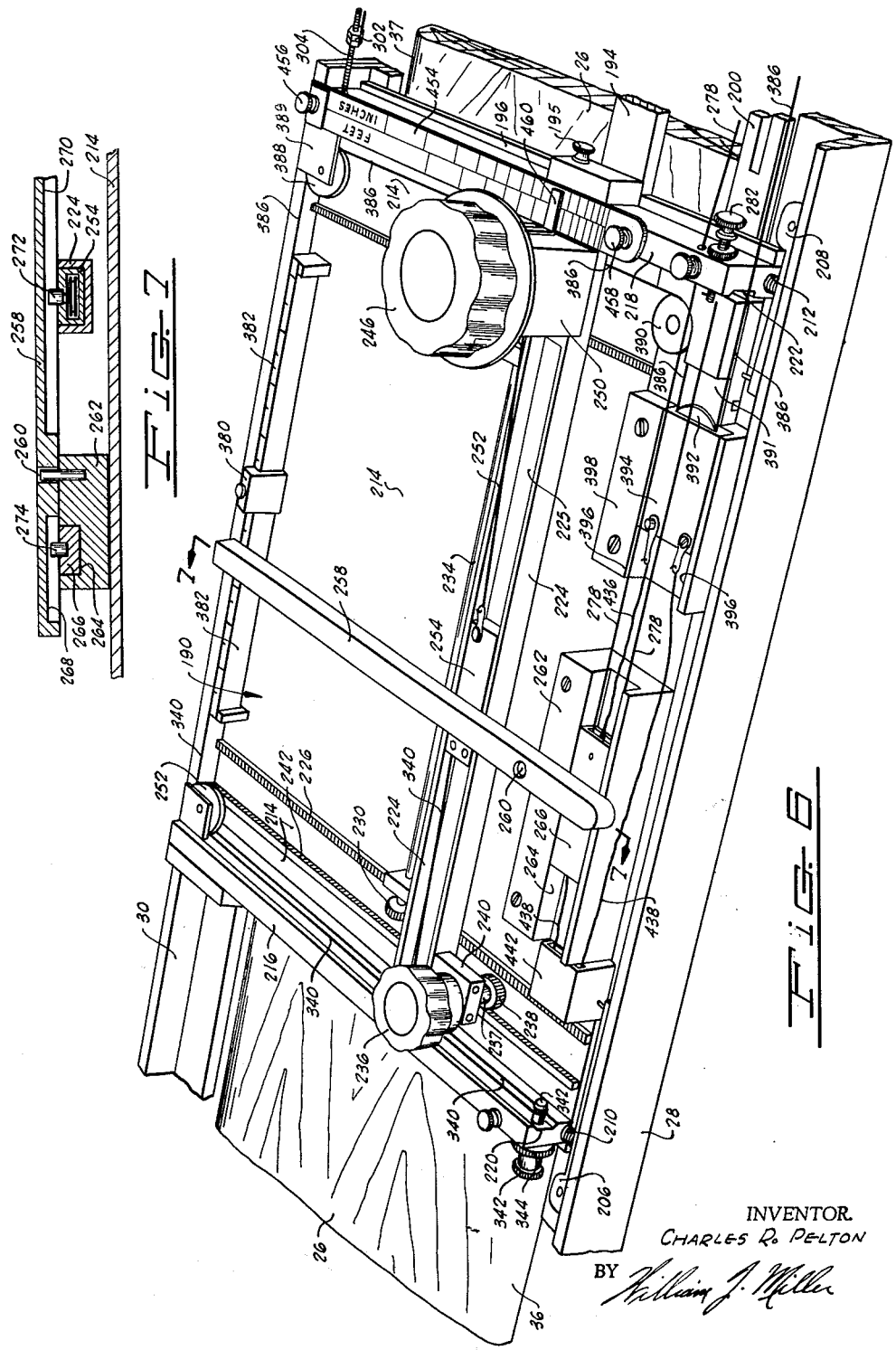

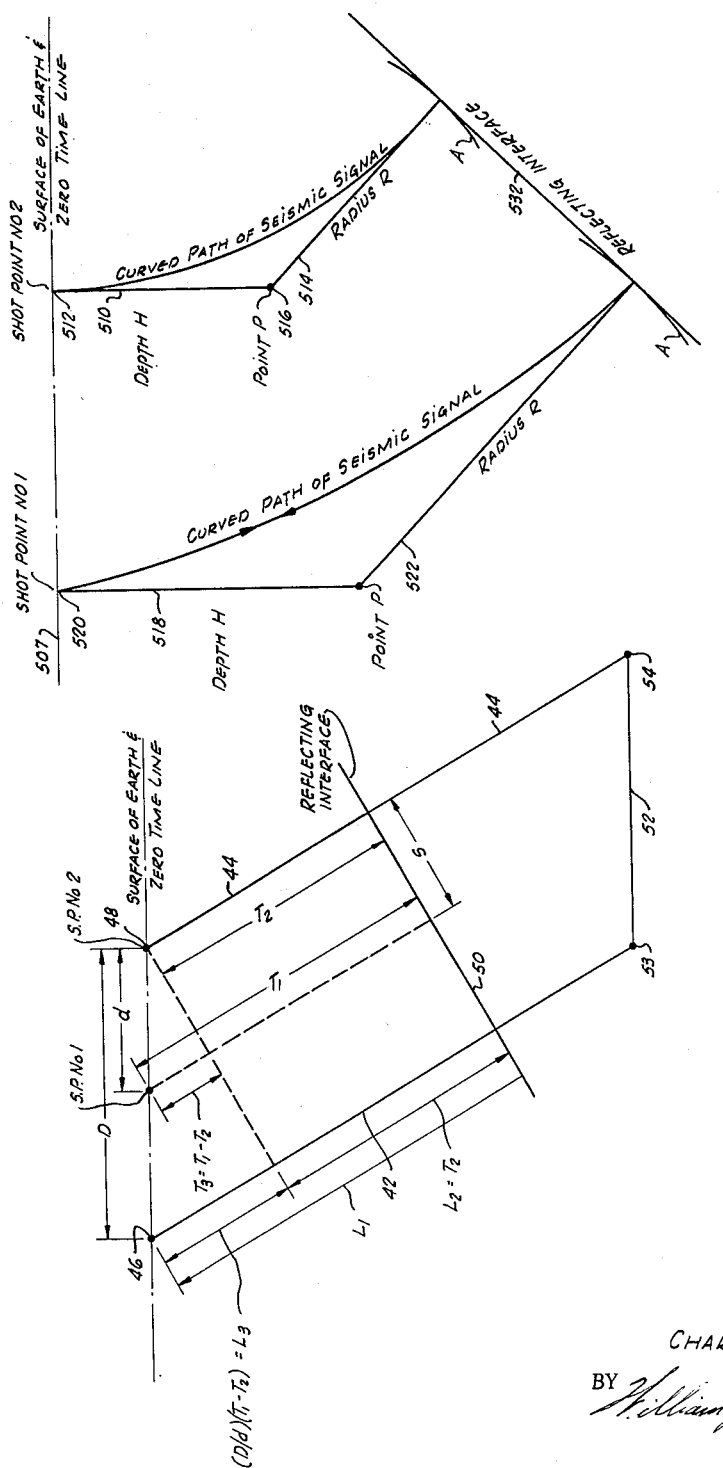

United States Patent Office 3,154,855
Patented Nov. 3, 1964

3,154,855
APPARATUS FOR PLOTTING SEISMIC DATA
Charles R. Pelton, Ponca City, Okla., assignor to Continental Oil Company, Ponca City, Okla., a corporation of Delaware
Filed Jan. 16, 1962, Ser. No. 166,613
17 Claims. (Cl. 33—18)

This invention relates to apparatus for interpreting reflection time data acquired by seismic surveying, and more particularly, but not by way of limitation, relates to apparatus for automatically locating and plotting the depth, displacement and dip of subsurface interfaces from seismograms recorded at two spaced points.

In conventional seismic survey methods, a sound or shock wave is induced into the ground at a "shot point" by some artificial means, such as an explosion or, more recently, by a suitable mechanical transducer. The shock waves disseminate in all directions from the shot point and, upon striking an interface between two distinct beds of a geological formation, are partially reflected back to the surface of the earth where they are detected and recorded by seismograph equipment. The reflected sound or shock waves are conventionally recorded on elongated, moving time records which travel at a uniform rate, so that the length of the time record of seismogram is equal to a certain time interval. Therefore, if the speed at which the shock waves travel through the particular formations is known, the length of the time record is a direct indication of the distance of the reflecting interfaces from the shot point.

During the field operation of recording the seismographic data, explosions are successively detonated at a series of shot points which are usually selected at somewhat equal spacings. The reflections from each detonation are picked up by a series of microphones or seismometers spaced along a line extending between the successive shot points and a separate recording made of the reflections picked up by each of the seismometers to produce what is termed a seismogram for that particular shot point. However, normally only the seismic reflections picked up by a seismometer located in close proximity to the shot point are used to actually plot the depth of the reflecting interfaces. The signals recorded by the seismometer nearest the shot point are known in the art as the "near-times." The signals picked up at the remaining seismometers are normally used only to correlate the seismogram recorded at a particular shot point with the seismograms recorded at adjacent shot points.

After a seismogram has been made at one shot point, the equipment is moved to the next successive shot point, which is a known distance from the first shot point. A second detonation is made and the reflections recorded by a series of seismometers, including a seismometer located adjacent the second shot point, to produce a second seismogram. By knowing the distance between the two adjacent shot points and the speed at which the seismic waves travel through the earth, the depth, displacement and dip of a reflecting interface can be located. The speed at which sound travels through a particular geological formation varies primarily with the density of the formation and must be established in some suitable manner, such as by comparing the recorded data with known locations of the reflecting interfaces in a previously drilled well bore.

After several seismograms have been recorded at several shot points, it is customary in the art, and is desirable in this case, to correlate and place the several near-time seismograms recorded at the several shot points on a single sheet of paper with the corrected times matching, and with the seismic traces extending generally parallel along the time record. This compilation of near-times is most conveniently used in connection with the present invention, but it is to be understood that any two seismic traces recorded against time can be used, provided necessary corrections in the data are first made.

According to the most generally accepted theory, the shock waves are refracted by changes in density of the formation and are partially reflected from the interfaces between distinct beds in the same manner that light is refracted by passage through various media and reflected from mirrors. In accordance with one accepted theory, the changing density of the earth, which increases with depth, results in the seismic signals traveling in a curved path through the earth. All accepted seismographic theories hold that the shock waves recorded as near-times are reflected only at right angles to the reflecting interfaces. Therefore, if a reflecting interface is dipping, i.e., disposed at an angle to the horizontal, the true location of the reflecting interface can only be to one side or the other of the recordation point, depending upon the direction of dip, and the reflections recorded as the near-times on the seismograms are those which strike and are reflected at right angles to the reflecting interfaces.

The oil industry relies heavily upon seismograph data in the search for valuable petroleum deposits. In order to utilize the seismic data, the problem of locating the subsurface interfaces must be solved to precisely locate the depth, the lateral or horizontal displacement from the shot points, and the dip of the beds forming the interfaces. From this subsurface survey information, topographic subsurface maps can be compiled and valuable deductions can be made with respect to the probability of the presence of valuable oil or gas deposits.

As is well-known in the art, many analytical methods have been devised for locating the true position and dip of reflecting interfaces. However, these solutions invariably require tedious mathematical solutions which usually can only be performed by electronic calculators. Apparatus has also been proposed for graphically locating the reflecting interface at its true depth, displacement and dip. However, the prior art graphical apparatus first requires some calculation and compilation of numerical data and then requires extensive manual setting of the various scales to graphically solve the location problem. In addition to being time-consuming, use of this type of apparatus results in considerable human error.

Therefore, in accordance with the present invention, apparatus is provided for automatically plotting the depth, displacement and dip of subsurface interfaces directly from seismographic time records compiled at two spaced recordation points. The plotting apparatus is, in general, comprised of a frame for supporting a worksheet upon which the data is to be graphically plotted. A pair of arms are pivotally connected to the frame and extend over the worksheet. A plotting shoe extends between the two arms and is connected to the arms in such a manner as to always remain at right angles to the arms. The plotting shoe is also movable along each of the arms. A pair of seismic time records, or seismograms, are supported upon a suitable elongated surface. A pair of reference marks are movable over the time records, and are individually registered with corresponding seismic events or "picks" on the respective seismograms. An individual servo means is provided for positioning the plotting shoe on each of the respective arms at a distance from the pivot point of the arm corresponding to the distance of the respective reference mark from the zero time reference on the time record. Therefore, as each of the reference marks are moved to the respective "picks" on the respective seismograms, the plotting shoe is moved by the respective servo means along the respective arm to a scalar distance from the pivot point of the arm corresponding to the actual distance of the reflecting interface from the shot point on the surface of the earth. Since the plotting shoe is maintained perpendicular to both of the arms at all times, the arms will automatically be angularly displaced by the force exerted on the plotting shoe by the servo means until the position of the plotting shoe corresponds to the true depth, horizontal displacement, and dip of the reflecting interface.

Therefore, it is an important object of the present invention to provide an apparatus for automatically plotting the depth, displacement and dip of subsurface interfaces directly from a pair of seismographic time records to greatly expedite interpretation and compilation of seismic data and to greatly reduce the recurrence of human error during the interpretation and compilation process.

Another important object of the present invention is to provide an apparatus of the type described which is of relatively simple and reliable construction and which can easily be used by a relatively unskilled person for compiling subsurface maps form seismic data with a high degree of accuracy.

Another important object of the present invention is to provide an apparatus of the type described having a novel, simple and highly accurate servomechanism for automatically moving the plotting shoe along the arms as previously described.

Another important object of the present invention is to provide apparatus of the type described wherein the arms are pivotally supported at fixed points to provide a simplified construction, and the servomechanism includes a proportionalizing means to compensate for variations in the distance between the shot points used to produce a pair of seismograms.

Another important object of the present invention is to provide apparatus of the type described in which the plotting shoe will be positioned approximately in accordance with the curved path theory of wave propagation caused by varying densities of the earth.

Another important object of the present invention is to provide apparatus of the type described in which the worksheet upon which the geological formations are being plotted is movable relative to the plotting mechanism, so that data recorded at successive points on the surface of the earth can sequentially be recorded with ease and accuracy to compile a vertical section of the subsurface strata.

Another important object of the present invention is to provide a novel means for scribing the interface of the subsurface strata on a worksheet after it has been accurately located by a plotting shoe.

Many additional objects and advantages of the details of construction and combination of parts will be evident from the following description and drawings, wherein:

FIGURE 1 is a front perspective view of a seismic data plotting device constructed in accordance with the present invention.

FIGURE 2 is a schematic cross section of a part of the device of FIG. 1.

FIGURE 3 is a perspective view of the top center portion of FIG. 1 showing details of construction.

FIGURE 4 is a cross section of a portion of the device of FIG. 1 showing details of construction.

FIGURES 5A and 5B, taken together, constitute a schematic diagram of the device of FIG. 1 with the cables and pulleys shown in solid lines and structure shown in broken lines.

Figure 5C:
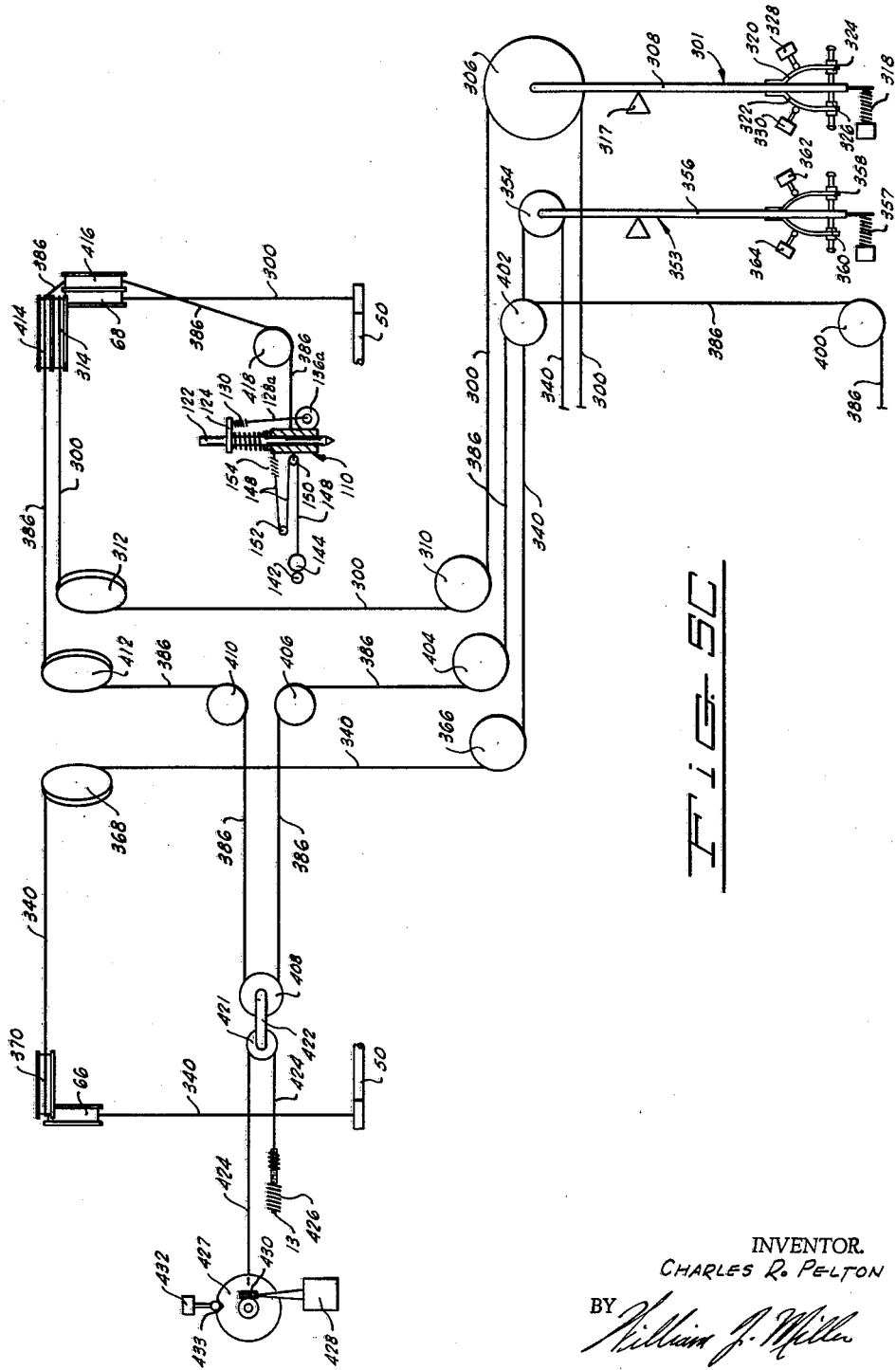

FIGURE 5C is a schematic diagram of structure which is to be used alternatively with that shown in FIG. 5B and is to be considered with FIG. 5A.

FIGURE 6 is a perspective view of a part of the plotting apparatus of FIG. 1 showing details of construction of the reference carriage.

FIGURE 7 is a vertical section taken substantially on lines 7—7 of FIG. 6.

FIGURE 8 is a schematic drawing illustrating the theory by which the plotting device of FIGS. 1–7 graphically locates a reflecting interface.

Figure 9:
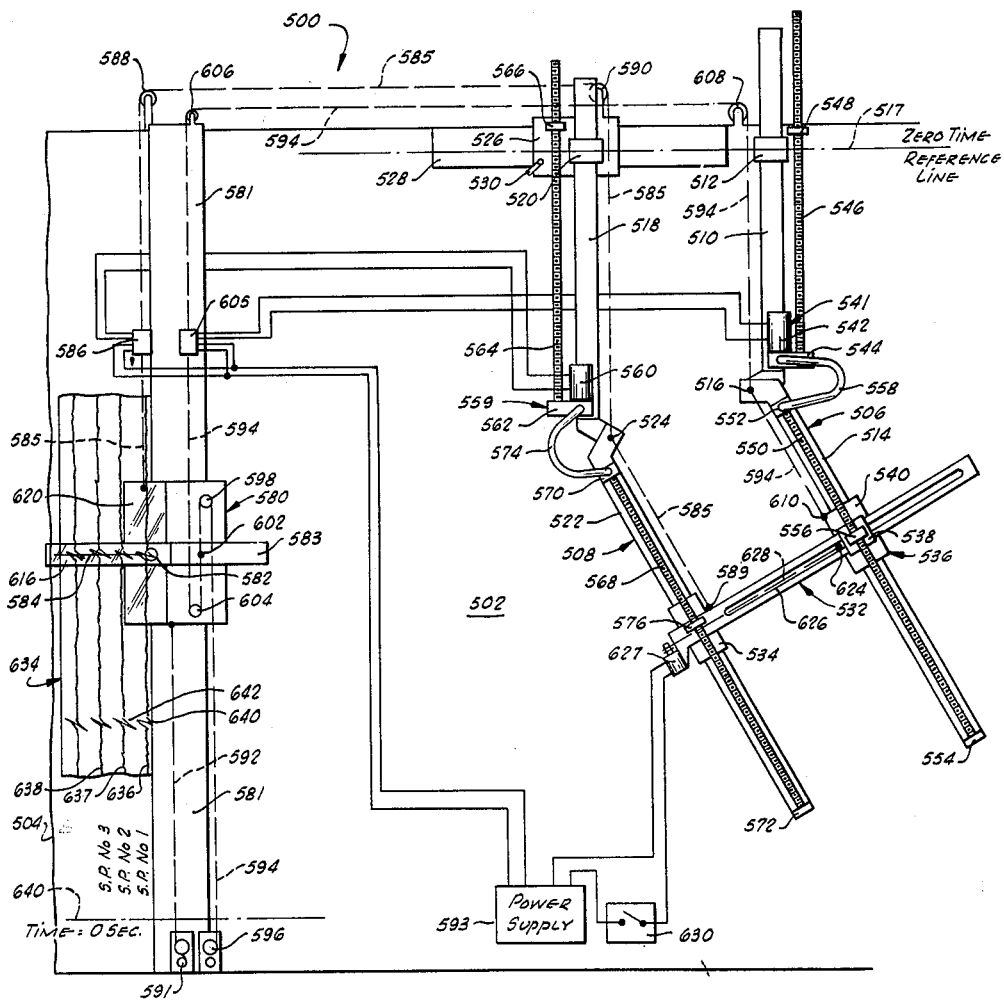

FIGURE 9 is a schematic diagram of another embodiment of the present invention which approximately locates the reflecting subsurface interfaces in accordance with the theory that the seismic signals travel along a curved path.

FIGURE 10 is a schematic drawing illustrating the theory by which the plotting device of FIG. 9 graphically locates a reflecting interface.

Referring first to FIG. 8, a seismogram produced at shot point S.P. No. 1 recorded a time $T_1$ for a seismic event or reflection from an interface which it is desired to locate. A seismogram produced at shot point S.P. No. 2 recorded a time $T_2$ for a reflection from the same interface by knowing the distance $d$ between the two shot points and the average speed at which sound travels through the particular geological formations, and assuming that the sound waves or seismic signals travel at a uniform, average speed in a straight line and are reflected only at right angles from the reflecting interface, the interface can be graphically located by solution of the geometric problem as indicated in FIG. 8. The first embodiment of the present invention utilizes this theory and assumptions to locate the section of a reflecting interface as hereafter described in detail.

Referring now to FIG. 10, a second theory is graphically illustrated which is generally accepted by those skilled in the art as more accurate for locating a reflecting interface by means of seismograms recorded at shot points Numbers 1 and 2. This theory takes into consideration the fact that the sound waves are refracted by passage through formations of progressively greater density so that the seismic sound signals actually travel in curved paths as indicated. In accordance with the theory, the reflecting interface will be located tangent to an arc having a radius R scribed about a point P located a vertical depth H below the respective shot point. The ratio between the radius R and the depth H is actually a function of the rate at which the density of the earth changes with depth, but for practical purposes can be considered as remaining constant. The second embodiment of this invention utilizes this theory for locating the reflecting interface sections, as is hereafter described in detail.

Referring now to FIG. 1, a preferred embodiment of a plotting apparatus constructed in accordance with the present invention is indicated generally by the reference numeral 10. The plotting apparatus 10 is comprised generally of a worksheet support section 11 and a seismograph record support section 12. The worksheet support section has a large rectangular frame 13 which is preferably supported at approximately 75° to the horizontal by suitable leg braces (not shown). The frame 13 supports a worksheet easel 14. The easel 14 preferably has a highly accurate planar face upon which a large worksheet may be placed. The seismic data may then be plotted on the worksheet. The easel 14 is slidingly supported along its lower edge by a track 16 which extends substantially the length of the frame 13. The top edge of the easel 14 is retained in position by overhanging brackets 18 and 20 which are connected to the frame 13. The easel 14 is readily movable in the horizontal direction by a knob 22 which is connected to a shaft (not shown) journaled on the frame 13. A pinion gear (not shown) is connected to the shaft and meshes with a rack gear 24 connected to the lower edge of the easel 14. Therefore, merely by twisting the knob 22, the entire easel 14 may be moved horizontally along the track 16 relative to the frame 13.

The record support section 12 has a flat, elongated seismogram supporting table 26 having an upper surface preferably disposed in horizontal position adjacent the lower edge of the worksheet support section 11. A pair of angle iron rails 28 and 30 are disposed in parallel relation and on each side of the seismogram support table 26. The rails 28 and 30 may be interconnected at their ends by transverse end braces 32 and 34 in any suitable manner. The record support table 26 may conveniently be fabricated from a wooden plank having rounded upper edges 36 and 37, as best shown in FIG. 2. The plank is spaced slightly below the rails 28 and 30 to provide spaces 38 and 39 between each rail and the rounded edges of the plank. This provides a means for inserting a long and wide record sheet 40 having a number of successive seismograms oriented thereon in such a manner as to permit the sheet to be easily moved across the record or seismogram support table 26 to plot data from the successive seismograms as hereafter described. The entire record support section 12 is preferably supported waist-high by suitable legs (not shown) to facilitate operation of the apparatus, as hereafter described.

A pair of arms, left-hand arm 42 and right-hand arm 44, are pivotally connected to the frame 13 at fixed pivot points 46 and 48, respectively, and extend over the worksheet support easel 14. A plotting shoe, indicated generally by the reference numeral 50, is slidably along and is connected at right angles to the arms 42 and 44 by couplings 86 and 98, as hereafter described. The lower ends of the arms 42 and 44 are pivotally interconnected by a spacer rod 52 at pivot points 53 and 54. The spacer rod 52 assists in maintaining the arms 42 and 44 in parallel relationship. In this connection, it will be noted that the portion of the frame 13 between the pivot points 46 and 48, the arms 42 and 44, and the spacer rod 52 form a parallelogram in which the arms 42 and 44 will always be maintained in parallel relationship.

Referring now to FIG. 3, which shows the arms 42 and 44 and the plotting shoe in greater detail, it will be noted that the arms 42 and 44 preferably comprise tubular members having slots 55 and 56, respectively, extending the length of the respective arms. The arms 42 and 44 are rigidly connected to F-shaped frames 58 and 60, respectively. The F-shaped frames 58 and 60 are pivotally mounted on blocks 62 and 64, respectively, which in turn are rigidly connected to the frame 13 to form the pivot points 46 and 48 previously referred to. The pivot point 46 is directly aligned with the vertical edge of the sheave 66, while the pivot point 48 is directly aligned with the vertical edge of the sheave 68. The sheaves 66 and 68 are journaled in blocks 70 and 72, respectively, which are rigidly connected to the F-shaped frames 58 and 60, respectively.

The plotting shoe 50 is comprised of a tubular member 74 which is of substantially the same construction as the tubular arms 42 and 44. The tubular member 74 has an elongated slot 76 which faces downwardly, as best seen in FIG. 4. The tubular member 74 is rigidly connected to end plates 78 and 80. The end plates 78 and 80 are interconnected by rods 82 and 84 to provide a track for a scribing carriage 110 as hereafter described. The left-hand end of the plotting shoe 50 is slidably connected at a right angle to the left-hand arm 42 by a coupling 86.

The coupling 86 is comprised of a plug 88, which is slidably disposed in the tubular arm 42, and a dowel pin 90 which is rigidly connected to the plug 88 and extends through the slot 55. The dowel pin 90 is rigidly connected to a plate 92 which in turn is rigidly connected to the tubular member 74 of the plotting shoe 50. The rigid right angle coupling 86 between the tubular reference shoe member 74 and the arm 42 insures that the plotting shoe 50 is maintained at a right angle to the arm 42 at all times, yet permits the plotting shoe 50 to move longitudinally along the arm. The plug 88 is preferably provided with Teflon bushings 94 and 96 at the ends thereof which are received in very close sliding relation within the tubular arm 42 to insure that the right angle is precisely maintained and yet not produce an appreciable amount of friction.

The right-hand end of the plotting shoe 50 is slidably connected to the right-hand arm 44 by a coupling 98 (see FIG. 4). The coupling 98 includes a plug 100 which is slidingly disposed within the tubular arm 44. A similar plug 102 is slidably received within the tubular member 74 of the plotting shoe 50. The plugs 100 and 102 are rigidly interconnected at right angles by a dowel pin 104 which passes through the slot 56 in the tubular arm 44 and through the slot 76 in the plotting shoe tubular member 74. The plugs 100 and 102 are preferably provided with Teflon bushings 106 and 108, respectively, which function in the same manner as bushings 94 and 96, previously described, to insure that the plotting shoe 50 is maintained at precisely a right angle to the arm 44 and yet produce a minimum of friction. It will also be noted that the coupling 98 permits the plotting shoe to move transversely of the arm 44 when the plug 102 slides within the tubular member 74.

A scribing carriage indicated generally by the reference numeral 110 has a body 112 through which sleeves 114 and 116 extend. The sleeves 114 and 116 receive the rods 82 and 84, respectively. The scribing carriage 110 carries a pencil 122 which is received in a vertical bore 123 (see FIG. 5B) in the carriage 110. A tab 124 is connected to the pencil 122, and the pencil 122 is biased out of contact with a worksheet placed on the easel 14 by a first coil spring 126. A cable 128 is connected to the tab 124 by a second coil spring 130 which is considerably stronger than the first spring 126. A follow-up cable 129 directly interconnects a point on the cable 128 and the scribing carriage block 112. However, it will be noted from the drawings that the cable 128 is loose when the scribing pencil is in the raised position. The cable 128 passes around a sheave 132 and is wound around the shaft 134 of an electric motor 136. The motor 136 is mounted on a plate 138 which is connected to the end plate 78 of the plotting shoe 50. A guide plate 140 is provided on the end of the shaft 134 to assure that the cable 128 will be retained on the shaft. The motor 136 is preferably energized by a food pedal actuated switch (not shown) through a D.C. electrical circuit including a wire 137 extending parallel to arm 42 and sliding contact block 137a (see FIG. 3) mounted on the plotting shoe 50. The circuit is completed by grounding to any part of the plotting shoe or arm structure. When the motor 136 is energized through a D.C. circuit including a wire 137 and contact slide 137a (see FIG. 3), the cable 128 is wound around the shaft 134. The tab 124 and pencil 122 are first pulled downwardly against the force of the spring 126 and the pencil is moved into engagement with a worksheet on the easel 14. Then, after the cable 128 has been wound on the shaft 134 sufficiently to tension the follow-up cable 129, the scribing carriage 110 will be pulled to the right along the rods 82 and 84 across the plotting shoe to scribe a line on a worksheet as hereafter described. The cable 128 is sufficiently long to permit the scribing carriage 110 to move to the left-hand limit of its travel adjacent the arm 42.

A constant tension tape spring motor 142 is provided to return the carriage 110. The spring motor 142 drives a cable drum 144 and is mounted on a bracket 146 which is connected to the plate 80. The cable drum 144 carries a cable 148 which passes around a sheave 150 journaled on the scribing carriage 110 and then back around a sheave 152 journaled on the plate 92. The cable 148 is then connected by a coil spring 154 to another adjusting cable 386, which is hereafter described in greater detail. It is sufficient at this point merely to say that the cable 386 passes through a bore 155 (see FIG. 5B) in the block 112. The bore 155 is sufficiently small that the spring 154 cannot pass therethrough so that the movement of the scribing carriage 110 to the left is limited by the position of the cable 386 as hereafter described in greater detail. However, the scribing carriage 110 can be pulled to the right to scribe a line on a worksheet without affecting the cable 386 because the cable 386 is not connected to the scribing carriage 110 but instead passes through the bore 155. As the scribing carriage 110 is moved to the right by the motor 136, the cable 148 will be unwound from the spool 144, even though the cable 386 is stationary, by reason of the fact that the sheave 150 is journaled on the scribing carriage 110. Therefore the tension in the cable 148, which acts on the carriage through the sheave 150, will counteract the tension in the cable 128 and maintain positive control of the scribing carriage 110 at all times. Also, when the motor 136 is de-energized, the scribing carriage 110 will be returned to the left by the force of the spring motor 142 acting through the cable 148 on the sheave 150 until the carriage abuts the spring 154. An alternative mechanism for moving the scribing carriage to the right to scribe a line on a worksheet is illustrated in FIG. 5C and is hereafter described in detail.

Separate electrical servomechanisms are provided for driving the left-hand and right-hand ends of the plotting shoe 50 upwardly and downwardly along the right-hand and left-hand arms 42 and 44, respectively. The servomechanism for driving the left-hand end of the plotting shoe 50 includes a reversible electric servomotor 156 which is connected by a gear box 158 to drive a cable drum 160. The cable drum 160 is journaled between the vertical flanges 162 and 164 of the F-shaped frame 58. An endless-type cable 166 is wound around the drum 160 in such a manner that the upper-extending reach 168 will be unwound from the drum as the lower-extending reach 170 is wound onto the drum, and vice versa. The upper-extending reach 168 passes around a sheave 172 which is journaled in a block 174 connected to the upper end of the tubular arm 42. The upper reach 168 then passes downwardly through the center of the tubular arm 42 and is connected to the upper end of the plug 88 which, as previously described, is slidably disposed within the tubular arm 42. The lower reach of the cable 170 extends downwardly and passes around a sheave 176 (see FIG. 1) journaled on the lower end of the arm 42, then passes upwardly through the interior of the tubular arm 42 and is connected to the lower end of the plug 88 by a suitable coil spring 178. Therefore, when the servomotor 156 is energized and driven in a direction so as to wind the lower reach 170 and unwind the upper reach 168 of the cable, the plug 88 will be moved downwardly within the tubular arm 42; and when the motor 156 is driven in the other direction, the plug 88 will be moved upwardly within the tubular arm. Since the left-hand end of the plotting shoe 50 is rigidly connected at a right angle to the plug 88, the plotting shoe 50 will be moved relative to the arm 42 and yet remain at a right angle to the arm 42.

The servomechanism for driving the right-hand end of the plotting shoe along the right-hand arm 44 includes an identical electric servomotor 180 which is connected by gear box 181 to drive a second cable drum 182, all of which are mounted on the F-shaped frame 60. The upper reach 183 of an endless-type cable 184 which is wound on the drum 182 passes around a sheave 185 journaled at the top end of the arm 44. The upper reach 183 then passes downwardly through the tubular arm 44 and is connected to the upper end of the plug 100 which is slidingly disposed within the tubular arm 44 as previously described. The lower reach 186 of the cable 184 passes around a sheave 187 (see FIG. 1) journaled at the lower end of the arm 44, then passes upwardly through the tubular arm 44 and is connected to the lower end of the plug 100 by a coil spring 188. The plug 100 is moved upwardly and downwardly within the tubular arm 44 by operation of the motor 180 in the same manner that the plug 88 is moved by the motor 156, as previously described. Therefore, since the right-hand end of the plotting shoe 50 is slidably connected to the right-hand arm 44 by the coupling 98, when the plug 100 is driven by the servomechanism, the plotting shoe 50 will be forceably moved upwardly or downwardly along the arm 44, as the case may be.

From the foregoing description of the arms 42 and 44, the plotting shoe 50, and the servomechanisms for moving the plotting shoe 50 along the respective arms, it will be evident that so long as the left-hand end of the plotting shoe is the same distance from the pivot point 46 of the left-hand arm 42 as the right-hand end of the plotting shoe 50 is from the pivot point 48 of the right-hand arm 44, the arms will extend vertically downward, substantially as shown in FIG. 1. However, should the left-hand end, for example, of the plotting shoe 50 be forceably moved upwardly along the left-hand arm 42 by the left-hand servomechanism, both arms will be pivoted to the left, or clockwise. The arms are forced to pivot because of the rigid right angle which is maintained between the plotting shoe and the arms 42 and 44 by the couplings 86 and 98, respectively. Conversely, should the left-hand end of the plotting shoe 50 be driven downwardly by the servomechanism, the arms 42 and 44 would be pivoted to the right, or counterclockwise.

In this connection, it should be noted that if the arms are pivoted appreciably in either direction, the weight of the arms 42 and 44 and the plotting shoe 50 would tend to bend the arms downwardly and introduce errors in the plot of the interfaces. Therefore, counterbalance cables 189 are connected to each of the pivot points 53 and 54 and are tensioned to support the arms by spring motors 189a connected to the frame 13. Therefore, as the arms swing to the right, the right-hand cable 189 acts more at a right angle to the arms and thereby assists in supporting the weight of the arms, while the left-hand cable 189 pulls generally parallel to the arms and therefore is rendered largely ineffective. The converse applies when the arms swing to the left.

As previously mentioned, FIG. 8 is a schematic diagram of the graphical solution of a sample seismographic problem. A seismogram produced at a shot point S.P. No. 1 recorded a near-time $T_1$ for a seismic reflection from the interface. A second seismogram taken at shot point S.P. No. 2 recorded a time $T_2$ for a seismic reflection from the same interface. The shot points Nos. 1 and 2 were separated by some distance $d$. By assuming that the seismic sound waves travel through the earth in a straight line and that the near-time seismic signals are reflected only at right angles from the reflecting interface, the reflecting interface would be located in the position shown. In the plotting apparatus 10, the right-hand arm 44 corresponds to the path of seismic signals produced and recorded at shot point No. 2. If the distance between the shot points Nos. 1 and 2 were equal to the distance between the two pivot points 46 and 48, the left-hand arm 42 would correspond to the path of the seismic signals produced and recorded at shot point No. 1. The plotting shoe, which is maintained at right angles to the arms 42 and 44 in accordance with the angle at which the seismic signals are reflected from the interface, would then correspond to the reflecting interface. Then merely by driving the plotting shoe 50 along the right-hand arm 44 to a distance from the pivot 48 corresponding to the time $T_2$, and along the left-hand arm 42 to a distance from the pivot 46 corresponding to $T_1$, the plotting shoe would automatically locate the position of the reflecting interface. These criteria can readily be accomplished by making the pivots 46 and 48 adjustable relative to each other along the zero time line, which corresponds to the surface of the ground. Or in the alternative, as is done in the embodiment illustrated in FIGS. 1–7, the pivot points 46 and 48 can be spaced a fixed distance D apart and the plotting shoe 50 moved a corrected distance $L_1$ from the pivot point 46 to produce the same result.

It will be noted from the diagram of FIG. 8 that the distance from the pivot 48 along the arm 44 to the plotting shoe 50 is represented by a time $T_2$. As mentioned in the introductory material above, the time $T_2$ is determined by recording the reflected seismic signals on a uniformly moving record strip. Therefore, the actual distance of the recorded signal from the zero reference line on the record is a direct indication of the time $T_2$. The distance or some multiple thereof, may be taken directly from the time record and used to position the plotting shoe 50 on the right-hand arm 44. Then, if the average speed at which sound travels through that particular geological formation is known, the actual distance in feet can readily be ascertained by a suitable scale. The same procedure, of course, can be used to position the plotting shoe 50 on the left-hand arm 42, provided that if the pivots 46 and 48 are fixed, the distance between the pivot 46 and plotting shoe 50 is increased to compensate for the difference in scalar spacing between the pivots 46 and 48 and the actual shot points Nos. 1 and 2, as is hereafter explained in greater detail.

The embodiment of the present invention shown in FIGS. 1–7 employs a control system for the servomechanism of the right-hand arm 44 which takes time-distance data directly from a seismogram recorded at shot point S.P. No. 2, while a control system for the servomechanism of the left-hand arm 42 takes time-distance data directly from a seismogram recorded at shot point S.P. No. 1, but automatically introduces a correction factor to compensate for the fact that the scalar spacing between the fixed pivot points 46 and 48 is greater than the scalar spacing between the two shot points at which the two seismograms were recorded.

As previously described, a record support table 26 is provided for supporting a record sheet having seismograms thereon from which the time-distance data is to be taken. Referring now to FIGS. 5A and 6, a reference carriage is indicated generally by the reference numeral 190. The reference carriage 190 is slidable along the rails 28 and 30 and over the record support table 26. The reference carriage 190 may be provided with rollers (not shown) on the bottom which travel on the horizontal flanges of the angle iron rails 28 and 30, or may slide directly on the lower flanges of the angle iron rails 28 and 30. Rollers 202 and 204 are journaled on arms 206 and 208, respectively, which are pivotally connected to the carriage 190 and are urged outwardly by springs 210 and 212, respectively, to continually urge the reference carriage 190 against the vertical flange of the rail 30. A constant force spring motor 315 (see FIG. 5A) is fixed to some part of the frame of the record support section 12 and continually biases the reference carriage 190 to the left by means of a cable 315a for purposes hereafter described in detail.

A right-hand reference mark 192 for the control system for the right-hand servomechanism is directly connected to the reference carriage 190. The right-hand reference mark 192 is scribed on a transparent plastic block 193 which is carried by an arm 194. The arm 194 is adjustably connected to the reference carriage 190 by a suitable thumbscrew 195 and associated bracket. When the thumbscrew 195 is loosened, the arm 194 can be moved transversely across the edge 196 of the reference carriage 190, but the arm 194 will always remain parallel to the rails 28 and 30 so that the right-hand reference mark 192 is in the same longitudinal position on the reference carriage 190. A left-hand reference mark 197 for the control system for the left-hand arm servomechanism is movable longitudinally of the reference carriage. The left-hand reference mark 197 is scribed on a transparent plastic block 198 which is connected to a shuttle block 199. The second reference mark shuttle block 199 slides in a slot in an armlike rail 200 which is fixed to the reference carriage 190 and extends parallel to the rails 28 and 30. The control system for the left-hand arm servomechanism will hereafter be described in greater detail.

The control system for the right-hand servomechanism for driving the plotting shoe 50 along the right-hand arm 44 includes a cable 300 which directly interconnects the reference carriage 190 and therefore the right-hand reference mark 192, and the right-hand end of the plotting shoe 50, and a tension switch 301 (see FIG. 5B) for controlling operation of the servomotor 180 responsive to tension in the cable 300. The cable 300 is connected to the reference carriage 190 by an adjustable coupling comprised of a nut 302 threaded onto a bolt 304 which is connected to the carriage 190. The cable 300 extends parallel to the rail 30 and passes around the switch sheave 306 which is journaled on the switch lever 308 of the tension switch 301. The cable 300 then passes around a sheave 310, which is connected to the support frame 13 behind the easel 14, and then passes around the sheave 312 which can be seen in FIG. 3. The cable 300 then passes over a sheave 314 which is journaled on one end of a T-shaped support 316. The cable 300 then passes vertically downwardly along the axis of the pivot 48 and around the sheave 68. The cable 300 then extends parallel to the right-hand arm 44 and is connected to the right-hand end of the plotting shoe 50 by connection to the coupling 98.

Referring now to FIG. 5B and to the details of tension switch 301, it will be noted that the switch lever 308 pivots about a fulcrum 317 which is disposed at a midpoint of the switch lever. A spring 318 is connected to the other end of the switch lever 308. The spring 318 counteracts the bias of the spring motor 315 and places the cable 300 under what is herein termed neutral tension. A pair of bowed leaf spring cams 320 and 322 are connected to the switch lever 308 and are adjustable relative to the switch lever 308 by means of the threaded bolt and nut units 324 and 326, respectively. Microswitches 328 and 330 are positioned adjacent the bowed leaf spring cams 320 and 322, respectively, so that when the switch lever 308 is moved by either an increase or decrease in tension in the cable 300, either the microswitch 328 or the microswitch 330 will be closed by the respective leaf spring cam 320 or 322, as the case may be. Therefore, when the reference carriage 190 is manually moved to the left, when referring to FIG. 5A, the tension in the cable 300 will be increased and the force on the switch lever 308 will overcome the force of the spring 318 to move the switch lever 308 from its neutral position and close the microswitch 328. The microswitch 328 is connected to energize the motor 180 in such a manner as to drive the plug 100 and therefore the coupling 98 and plotting shoe 50, upwardly along the arm 44 and thereby reduce the tension in the cable 300 until the switch lever 308 moves back to the neutral position and the microswitch 328 opens. The plotting shoe 50 will then be at a position on the right-hand arm 44 corresponding to the position of the reference carriage, and therefore the first reference mark 192, on the record support table 26. When the reference carriage 190 is moved to the right in such a manner as to reduce the tension in the cable 300, the spring 318 pulls the switch lever 308 from the neutral position against the microswitch 330, and the closed microswitch 330 energizes the motor 180 in such a manner as to drive the plug 100 and therefore the right-hand end of the plotting shoe 50, downwardly along the right-hand arm 44 to increase the tension in the cable 300 back to the natural value and restore the switch lever 308 to the natural position to open the microswitch 330.

As previously mentioned, since the arms 42 and 44 are pivoted at fixed points 46 and 48, some means must be provided for introducing a multiplication or correction factor into the control system for the left-hand servo-mechanism, the correction factor being a function of the actual spacing between the shot points at which the two seismograms being plotted were recorded. The means for introducing this correction factor includes most of the structure carried on the base plate 214 of the reference carriage 190, and a second cable 340 and an associated tension switch 353, as hereafter described. A pair of end rails 216 and 218 are disposed in parallel relation at each end of the base plate 214 and extend transversely to the rails 28 and 30. The end rails 216 and 218 are provided with facing grooves 220 and 222, respectively, (see FIG. 6) which receives the ends of a longitudinally extending movable shuttle rail 224. The shuttle rail 224 has a channel-shaped cross section to form a groove track 225. The shuttle rail 224 is maintained at right angles to the end rails 216 and 218 by a gearing arrangement comprised of rack gears 226 and 228 and meshing pinions 230 and 232 which are splined on a shaft 234. A hand knob 236 is connected to a shaft 237 (see FIG. 6) which is journaled in a block 240 which in turn is connected to the shuttle rail 224. The shaft is provided with a pinion 238 which meshes with a third rack gear 242. The rack gear 242 is mounted on the base plate 214 and extends parallel to the end rails 216 and 218. When the hand knob 236 is twisted, the pinion 238 will drive the shuttle rail 224 transversely across the base plate 214. The motion will be transmitted through the pinion 230, shaft 234, and pinion 232 to the other end of the shuttle rail 244, and thereby maintain the shuttle rail 224 perpendicular to the end rails 216 and 218 at all times.

A second hand knob 246 is connected to a drum 248 (see FIG. 5A) which is journaled and housed within a block 250 which is in turn supported by the end of the shuttle rail 224. A cable 252 is wound on the drum 248 and is connected to a first shuttle block 254 which is slidably retained in the groove track 225 of the shuttle rail 224. A multiplication arm 258 extends over and is disposed generally perpendicular to the shuttle rail 224 and is pivotally journaled on a pivot pin 260. The pivot pin is supported by a block 262 which in turn is mounted on the base plate 214. A groove track 264 is cut in the upper surface of the block 262 and slidably receives a second shuttle block 266. The underside of the proportionalizing arm 258 is provided with longitudinally extending grooves 268 and 270 which extend on either side of the pivot pin 260 substantially to the ends of the arm 258. An upstanding pin 272 is connected to the shuttle block 254 and is slidably received in the groove 270. A similar pin 274 is connected to the shuttle block 266 and is slidably received in the groove 268.

A cable 278 is connected to the second reference mark shuttle block 199 and passes around a sheave 280 (see FIG. 5A) which is journaled within the shuttle block 266 and then is connected to an adjusting screw 282. The adjusting screw provides a means for adjusting the length of the cable 278 in order to calibrate the position of the second reference mark 197 as hereafter described. It will be noted that the left-hand edge (see FIG. 5A) of the sheave 280 is aligned with the pin 274. The cable 284 from the cable drum 285 of a constant tension spring motor 286 passes around a sheave 288 journaled on the block 199 and is connected by a spring to the end of the rail 200. The force of the spring motor 286 continually urges the shuttle block 199 and therefore the reference mark 197 to the right, towards the motor 286. The force of the spring motor 286 is transmitted through the cable 278 to the proportionalizing lever 258 and acts to tension the cable 252 which is wound around the drum 248. The position of the drum 248 is frictionally retained in any set position. It will be evident that rotation of the hand knob 246 in the clockwise direction will move the reference mark 197 to the left against the force of the spring motor 286, and rotation of the hand knob 246 in the counterclockwise direction will permit the spring motor 286 to move the reference mark 197 to the right.

The second cable 340 is connected to and wound around an adjusting bolt 342, which in turn is threaded through the rail 216. The bolt 342 may be provided with a locknut 344 so that the bolt may be locked in any desired position. The cable 340 passes around a sheave 346 (see FIG. 5A) which is journaled on the shuttle rail 224. The cable 340 then passes around a sheave 348 which is journaled within the shuttle block 254 with the right-hand edge of the sheave directly under the pin 272. The cable 340 then passes back around another sheave 350 which is also journaled on the end of the shuttle rail 224. The cable 340 then passes around a sheave 352 at the corner of the reference carriage 190 and extends parallel to the rail 30 and cable 300 to a second tension switch 353. It will be noted that the combination of the three sheaves 346, 348 and 350 permits the shuttle rail 224 to be moved transversely of the reference carriage 190 by operation of the hand knob 238 to introduce a correcting multiplication factor as hereafter described, without producing movement of the cable 340 relative to the sheave 352.

The tension switch 353 is identical to the tension switch 301 and the two tension switches may in the actual construction be superimposed one above the other and may then be located at the right-hand end of the record support table 26 in the housing 355 (see FIG. 1). The cable 340 passes around the switch sheave 354 which is journaled on the switch lever 356. The switch lever 356 is biased into neutral position by a coil spring 357 and is provided with adjustable, bowed spring cams 358 and 360 which actuate microswitches 362 and 364, respectively in the same manner that the spring cams 320 and 322 actuate the microswitches 328 and 330 of the tension switch 301. The cable 340 then passes around a sheave 366 which is also journaled on the frame 13 behind the easel 14. The cable 340 then passes upwardly to a sheave 368 which can be seen in FIG. 3. The cable 340 then passes upwardly and around a sheave 370 which is journaled on the T-shaped frame 316. The cable 340 then extends downwardly directly along the axis of the pivot point 46 and passes around the sheave 66. The cable 340 then extends precisely parallel to the axis of the left-hand arm 42 and is connected to the left-hand end of the plotting shoe 50.

When tension in the cable 340 is increased beyond a neutral tension, the switch lever 356 is moved against the force of the spring 357 to close the microswitch 362. The microswitch 362 is connected to energize the motor 156 in such a manner as to drive the plug 88 upwardly within the tubular arm 42, thereby moving the left-hand end of the plotting shoe 50 upwardly along the left-hand arm 42, until the tension in the cable 340 is reduced to the neutral bias so that the spring 357 will move the switch lever 356 back to neutral position and open the microswitch 362. When the tension in the cable 340 is reduced sufficiently that the spring 357 moves the switch lever 356 to close the microswitch 364, the microswitch 364 energizes the servo motor 156 in such a manner as to drive the plug 88 and therefore the plotting shoe 50 downwardly along the arm 42 until the tension in the cable 340 is increased to neutral bias and the switch lever 356 is again returned to neutral position to open the microswitch 364.

It will be evident that unless the neutral tension is maintained in the cables 300 and 340 by the spring motor 315 to counterbalance the force of the springs 318 and 357, the respective springs will bias the respective switch levers 308 and 356 from their neutral positions and close the microswitches 330 and 364, respectively, which would cause the plotting shoe 50 to be moved to the bottom of the arms 42 and 44. Therefore, the constant force of the spring motor 315 should be adjustable to vary the biasing tension as required to counterbalance the force of the springs 318 and 357. Also, the springs 318 and 357 can be made adjustable individually to precisely counterbalance and maintain the respective switch levers 308 and 356 centered in the neutral positions between the respective microswitches when no external manual force is applied to the reference carriage 190. It should also be noted that the cable 315a is substantially aligned with cables 300 and 340 so as not to form a torque couple which would tend to rotate the carriage 190.

The operation of the apparatus for introducing the multiplication or correction factor into the movement of the left-hand servomechanism will best be understood by combined reference to FIGS. 5A and 8. First it should be noted that all dimensions on the plotting apparatus 10 are represented in scalar time distance rather than in pure scalar distance. In order to convert the distance on the worksheet to actual feet, the speed at which the seismic sound waves travel through that particular geological formation must be known. Therefore, the distance D between the pivot points 46 and 48 is expressed in scalar time distance. Scalar time distance is herein expressed in seconds/inch and is convertible to feet/inch if the speed of sound through the ground in feet/second is known. The distance $d$ between shot points Nos. 1 and 2 is conventionally available only in feet as measured by the field crew, and must be converted to the scalar time distance. After the distance $d$ in feet has been converted to a scalar distance representing time, assume for purposes of illustration that the shot point No. 1 falls exactly at the midpoint between the pivot points 46 and 48. The scalar time distance $T_2$ between the right-hand end of the plotting shoe 50 and the right-hand pivot point 48 may be obtained directly from the seismogram taken at shot point No. 1 by movement of the reference carriage 190 until the right-hand reference mark 192 coincides with a seismic event or "pick" on the corresponding seismogram. During the same movement of the reference carriage 190, the left-hand end of the plotting shoe 50 will be moved along the left-hand arm 42 a distance $L_2$, which will be equal to the distance $T_2$, because the left-hand control cable 340 is also connected to the reference carriage 190. The difference between the two times $T_1$ and $T_2$, which is $T_3$, produces the dip and displacement of the reflecting interface. The distance $T_3$ is read directly from the two seismograms and is the distance between the right-hand reference mark 192 and the left-hand reference mark 197. The additional distance $L_3$ that the left-hand end of the plotting shoe 50 must be moved, which is $L_1$ minus $L_2$, is twice the distance $T_3$ because shot point No. 1 was assumed to be at the midpoint between the two pivot points 46 and 48. This means that the left-hand control cable 340 at this point must be moved twice as far as the left-hand reference mark 197, in order to induce the proper dip, as will be evident from simple geometry. This is accomplished by the positioning of the shuttle rail 224 and operation of the multiplication lever 258 in the following manner.

It will be noted that the shuttle block 266 only travels half as far as the shuttle block 199 and therefore half as far as the left-hand reference mark 197 because of the sheave 280 and cable 278. However, this is offset because the shuttle block 254 only travels half as far as the left-hand control cable 340 because of the sheave 348. Therefore, by causing the shuttle block 254 to move twice as far as the shuttle block 266, the left-hand control cable 340 will be made to move twice as far as the left-hand reference mark 197. This can be accomplished by moving the shuttle rail 224, by the hand knob 236, to a point where the pin 272 on the shuttle block 254 is twice as far from the pivot pin 260 as the pin 274 on the shuttle block 266 is from the pivot pin 260. It will also be noted that the multiplication factor is $D/d$ so that the distance the pin 272 should be set from the pivot pin 260 in any particular case is $D/d$ times the distance from the pivot pin 260 to the pin 274. It will be noted that seismograms recorded at shot points having a greater spacing than the distance between the pivot points 46 and 48 can be plotted, in which case the multiplication factor $D/d$ becomes less than one. However, in the embodiment described this is impractical because the length of the line which the scribing shoe 110 can scribe is limited to the spacing between the arms 42 and 44.

In order to quickly set the shuttle rail 224 in the proper position for shot points of any spacing, a scale strip 454 is positioned on the end rail 218 by suitable brackets and thumbscrews 456 and 458. A pointer 460 extends over the scale strip and is connected to the block 250 which in turn moves with the shuttle rail 224 thereby indicating the position of the pin 272. The scale strip 454 is provided with two separate scales, one indicated in feet and the other indicated in inches, as can be seen in FIG. 6. The relationship between the two scales is determined by the speed at which sound travels through the earth in the particular locality being surveyed. Since the foot scale will vary with each locality, in practice it is desirable to make up a number of foot scales at uniform increments of speed over the range of speeds which sound will travel through the earth. Then a scale strip can be selected to match the measured speed of sound for the particular locality. The inch scale will remain constant for all the strips and is provided as a convenience which expedites the plotting of a series of seismograms as hereafter described. By setting the pointer 460 at the distance $d$ between the shot points on the foot scale of the scale strip 454, the shuttle rail 224 and therefore the pin 272 will automatically be set at the proper position to introduce the correction factor $D/d$ to the movement of the left-hand control cable 340, as previously described.

In order to reduce the specific illustrative example above to a formula applicable to all circumstances, it will be noted from FIG. 8 that in order to position the plotting shoe along the reflecting interface, the plotting shoe must be moved to a scalar time position $T_2$ on the right-hand arm and a scalar time position $L_1$ on the left-hand arm. It will be evident that the scalar time distance $L_1$ is equal to the scalar time distance $T_2$ plus the scalar time distance $L_3$. The scalar time distance $L_3$ is equal to $(T_3)(D/d)$ or $T_1-T_2)(D/d)$. It follows that $L_1$ equals $T_2$ plus $(T_1-T_2)(D/d)$. Therefore, in order to position the plotting shoe on the reflecting interface, the right-hand end of the plotting shoe should be positioned on the right-hand arm a scalar distance $T_2$ from the pivot point 48 and the left-hand end of the plotting shoe should be positioned on the left-hand arm 42 a distance $T_2$ plus $(T_1-T_2)(D/d)$.

As will be noted in FIG. 8, the apparatus 10 is accurate for plotting only the section S of the subsurface interface because the dip of the interface may change sharply between the next adjacent shot points on either side. Therefore a means is provided for setting the position of the scribing carriage 110 prior to the actual plotting of the subsurface interfaces so as to automatically scribe a line of the proper length S for a particular spacing $d$ between two shopt points. This adjusting means includes a slide 380 which is movable along a scale 382 which is mounted on the base plate 214 of the reference carriage 190. The scale 382 is calibrated in inches for purposes hereafter explained. The slide 380 may be set in any desired position on the scale 382 by a suitable thumbscrew 384. A cable 386 is connected to the slide 380 and passes around a sheave 388 which is journaled in a block 389 connected to the reference carriage 190. The cable 386 continues around a sheave 390 which is journaled on a block 391 which is also mounted on the carriage 190. The cable 386 then passes around a sheave 392 and is journaled in a shuttle block 394. The shuttle block 394 is slidably retained within a groove track 396 in a block 398 which in turn is connected to the base plate 214. The cable 386 then continues parallel to the rail 28 and passes around sheaves 400 and 402 (see FIG. 5B) which are journaled on the frame of record support section 12. The cable 386 continues around sheaves 404 and 412, which are journaled on the frame 13 behind the easel 14. The sheave 412 can be seen in FIG. 3 as can the cable 386, which continues around a sheave 414 which is journaled on the same axle as the sheave 314 and is connected to one arm of the T-frame 316. The cable 386 then continues downwardly around the sheave 416 which is journaled in the block 72. The cable 386 then passes downwardly along the arm 44 and around a sheave 418 which is journaled in the block 420 (see FIG. 3). The cable 386 passes through the bore 155 and is connected by a spring 154 to the tension cable 148 as previously described.

Referring once again to the shuttle block 394, a cable 436 loosely, but directly, interconnects the shuttle block 394 and the shuttle block 266. Another loosely strung cable 438 is connected to the shuttle block 394, passes around a sheave 440 and is connected to the other end of the shuttle block 266. The sheave 440 is journaled in the block 442 which is connected to the base plate 214 (see FIG. 6). Each of the cables 436 and 438 are slightly loose so that the shuttle block 266 is free to move a short distance in either direction before one of the cables becomes taut. However, upon excessive movement of the shuttle block 266 in either direction, the shuttle block 394 will be moved to the left, when referring to FIG. 5A, to pull the cable 386 in such a manner as to move the scribing carriage 110 to the right and decrease the length of the line which will be scribed upon actuation of the scribing motors 428 and 136. This mechanism therefore pre-positions the scribing carriage 110 in accordance with the position of the arms 42 and 44 before the scribing carriage 110 is actuated to scribe a line, so that the line scribed will be approximately the correct length, as hereafter described in greater detail.

As previously mentioned, an alternative means may be employed for moving the scribing carriage to the right to scribe a line on a worksheet. The alternative means is schematically illustrated in FIG. 5C. It will be noted that FIG. 5C is generally the same as FIG. 5B except for additional structure in the upper left-hand corner of the drawing and some modifications of the scribing carriage 110, as hereafter described in greater detail. Therefore, wherever practical, the same numbers are retained in FIG. 5C as were used in FIG. 5B. In the apparatus of FIG. 5C, after the cable 340 passes around the sheave 404, it passes around a sheave 406 which is also journaled on the back of the frame 13. The cable 340 then passes around a free sheave 408 and then around a sheave 410 which is also journaled on the back of the frame 13. The cable 340 then continues around sheaves 412, 414, 416 and 418 as previously described in connection with the embodiment shown in FIG. 5B. However, instead of passing through the bore 155, as in the embodiment of FIG. 5B, the cable is connected directly to the scribing carriage 110. Also, the tension cable 148 is connected by the spring 154 directly to the scribing carriage 110. A motor 136a is mounted on the carriage 110 and, when energized, pulls the tab 124 downwardly by a cable 128a and spring 130 to move the scribing pencil 122 downwardly into contact with a worksheet, as will be described. Therefore, the motor 136a will move the scribing pencil 122 downwardly, the cable 340 will move the scribing carriage 110 to the right, as hereafter described, and the spring motor 142 and cable 148 will return the carriage to the left.

A second free sheave 421 is connected to the free sheave 408 by a yoke 422. A cable 424 is connected to the frame 13 by an adjustable spring 426 and passes around the sheave 421. The cable 424 is then connected to a point on the periphery of a relatively large disc 427. The spring 426 must be stronger than the spring motor 142 mounted on the plotting shoe 50. The disc 427 is driven by any suitable drive motor 428 and gearing arrangement such as the worm gear 430. A microswitch 432 is closed by contact with the periphery of the disc 427 and is opened when received in a suitable notch cam 433. The microswitch 432 is connected in parallel with a foot pedal actuated switch (not shown) so that when either the microswitch 432 or the foot pedal switch is closed, the motors 136a and 428 will be energized. Therefore, when the foot pedal is pressed by an operator, the motor 136a is energized and the cable 128a is wound onto the shaft 134. The cable 128a then pulls the scribing pencil 122 downwardly into engagement with the worksheet which may be on the easel 14. At the same time, the motor 428 is energized to start the disc 427 rotating and close the microswitch 432. The foot pedal can then be released by the operator and the microswitch will maintain the motors 136 and 428 energized. As the disc 427 continues to rotate, the free sheaves 408 and 421 will be pulled to the left to pull the scribing carriage 110 to the right against the force of the spring motor 142. When the disc 427 has made one revolution, the notch cam 433 will open the microswitch 432 and deenergize both motors 136a and 428 to lift the scribing pencil and stop the disc 427. Of course, the spring motor 142 will return the scribing carriage to the left-hand position during the last half-revolution of the disc 427 to double mark the line scribed by the pencil 122.

*Operation of Embodiment Shown in FIGS. 1–7*

In order to prepare the apparatus 10 for plotting seismic data, a worksheet is placed over and taped or otherwise secured to the easel 14. The worksheet will normally cover substantially the entire easel. The pivot points 46 and 48 will form a line which will correspond to the surface of the earth. The right-hand pivot point 48 will correspond to the right-hand or No. 2 shot point of each plot. The worksheet and the time record or seismogram will normally have some standardized time scale so that a standard number of inches on the seismogram or time record and therefore on the worksheet will equal one second. In this connection, the worksheet is preferably provided with horizontal lines which are vertically spaced at uniform intervals equal to one second. Therefore, if the average speed at which sound travels in the particular locality being surveyed is known, the true distance in feet can readily be ascertained by a suitable scale.

For orientation purposes, the rail 30 is preferably provided with equally spaced detents (not shown) or other suitable stops located at points spaced at one second intervals along the rail 30. The reference carriage 190 is then provided with a suitable spring biased insert (not shown) for the detent to lock the reference carriage 190 in a calibration position such that the reference mark 192 will correspond to the desired position of the three-second line, for example, on the seismogram. Also, when the reference carriage 190 is positioned at the three-second reference detent, the plotting shoe 50 should automatically be moved by the servomechanisms to the three-second horizontal line on the worksheet. Then the scribing carriage 110, if the plotting shoe 50 is properly oriented, should scribe a line directly on the three-second horizontal time line on the worksheet. If it does not, the length of the cable 300 can be adjusted by the nut 302 to raise or lower the plotting shoe 50 to the proper position or depth on the worksheet.

The multiplication arm 258 is then positioned precisely perpendicular to the shuttle rail 224 by adjustment of the hand knob 246. Perpendicular positioning of the multiplication arm 258 is easily checked by twisting the hand knob 236 to move the shuttle rail 224 transversely across the reference carriage 190. If the multiplication arm 258 is not pivoted about the pivot pin 260, it is perpendicular to the shuttle rail 224. The length of the cable 340 can then be adjusted by the screw 342 until the plotting shoe 50 is exactly horizontal and a line is scribed precisely on the three-second line of the worksheet when the foot pedal is pressed to cause the scribing carriage 110 to move across the plotting shoe and scribe a line, as previously described.

When the multiplication arm 258 is perpendicular to the shuttle rail 224, the reference marks 192 and 197 should also be precisely aligned perpendicular to the rails 28 and 30 and therefore should form a line parallel to the lever 258. The position of the reference mark 197 is easily adjusted by the thumbscrew 282 which adjusts the length of cable 278. After the cables 300, 340 and 278 have been adjusted as described, the apparatus 10 is then properly oriented for the plotting operation.

Next, the record sheet 40 is inserted through the spaces between the rails 28 and 30 and the record support table 26. The record sheet 40 preferably has a series of seismogram near-time traces 450, 451, 452, and 453 recorded at four separate shot points extending in parallel relation with the times of each seismogram properly oriented by methods well known in the art. The zero time line on the time record 40 is positioned to the left when referring to FIG. 1 so that as the reference carriage 190 is moved to the right over the increasing times of the seismograms, the plotting shoe 50 will be moved downwardly in accordance with the increased depth indicated by the increased time required for the sound to travel downwardly to the reflecting interfaces and be reflected back to the surface. Assuming that the reference carriage 190 has been positioned in the three-second detent for orientation, the three-second time line on the time record 40 is positioned in alignment with the right and left-hand reference marks 192 and 197, with the seismogram 450 from shot point No. 1 aligned transversely under the reference mark 197. Then the record sheet 40 is taped or otherwise secured in position on the support table 26. Next, the arm 194 is adjusted transversely of the reference carriage 190 by loosening the thumbscrew 195 so that the reference mark 192 can easily be aligned with the near-time trace 451 of seismogram from shot point No. 2. In this connection, it will be noted that the arm 194 and therefore the reference mark 192 can be moved to any transverse position on the reference carriage 190 without affecting the ultimate position of the plotting shoe 50. This follows from the fact that the position of the plotting shoe 50 is dependent solely upon the relative positions between the reference carriage 190, to which the right-hand cable 300 is attached, and the left-hand reference mark 197, which controls the position of the left-hand end of the plotting shoe 50 through cable 278, proportionalizing lever 258 and left-hand control cable 340. Therefore, in this embodiment, the transverse spacing between the adjacent seismograms 450 and 451 being plotted does not have a bearing on the operation of the machine.

A scale strip 454 most closely matching the speed at which sound travels through the ground of the particular locality being surveyed is selected and fixed in position on the end rail 218 by the thumb screws 456 and 458. The hand knob 236 is then twisted until the pointer 460 is positioned on the foot scale at the distance $d$ between the two shot points. This distance is measured by the field crew and is normally recorded on the record sheet 40. The shuttle rail will then be properly positioned such as to introduce the multiplication or correction factor to the movement of the left-hand cable 340 and consequently the movement of the left-hand end of the plotting shoe 50.

Next, assuming that the successive sections are to be plotted from left to right on the worksheet, the easel 14 is moved to the far right position by operation of the hand knob 22, which acts through a pinion (not shown) on the rack gear 24, thereby placing the left-hand edge of the worksheet under the arms 42 and 44. A right-hand pivot point reference mark 470 is provided on the lower edge of the frame 13 directly under, or vertically below, the pivot point 48 of the right-hand arm 44. A pencil mark is made on the worksheet at the pivot point reference mark and represents shot point No. 1. The pointer 460 has previously been set on the foot scale of the scale strip 454 to register with the distance $d$ between shot points Nos. 1 and 2. The inches scale on the scale strip 454 provides a scalar conversion from feet to inches so that the pointer will also register with the scalar distance between the shot points Nos. 1 and 2 in inches. The number of inches is then read from the scale on the scale strip 454 and a second pencil mark is made on the worksheet this distance from the mark representing shot point No. 1. The new pencil mark represents shot point No. 2. The easel 14 is then moved to the left by operation of the hand knob 22 until the pencil mark representing shot point No. 2 registers with the right-hand pivot reference mark 470.

Next, the slide 380 is set on the scale 382, which is marked off in true inches with the zero reading to the left, at a position corresponding to the scalar distance in inches between the Nos. 1 and 2 shot points, which was previously read from the scale strip 454. The scribing carriage 150 will thereby be moved to a point spaced from the right-hand arm 44 equal to the distance between the first and second shot points, and therefore can scribe a line only as long as the distance between the two shot points. The length of the line which can be scribed will be further shortened as the arms 42 and 44 pivot by operation of the pulley 398 and associated structure, as previously explained. The apparatus is now ready for plotting the displaced sections of the interfaces between the first and second shot points.

The reference carriage 190 will customarily be moved to the far left adjacent the zero time marks on the seismograms and the successive interfaces plotted from top to bottom as the reference carriage 190 is moved from left to right. To plot a section of a particular interface, the reference mark 192 is positioned over the seismogram recorded at shot point No. 2 at a desired "pick"; for example, at the seismic event or "pick" 490 (see FIG. 5A). As the reference carriage 190 is manually moved to the left for placement over the "pick" 490, the tension in both the cables 300 and 340 will be increased so that the microswitches 328 and 362 will be closed. The motors 156 and 180 will be energized in a manner to drive the plotting shoe 50 upwardly along the respective arms 42 and 44. When the plotting shoe 50 has reached a position corresponding to the time depth of the "pick" 490, the tension in the cables 300 and 340 will be reduced sufficiently that the switch levers 308 and 356, respectively, will return to the neutral positions and open the respective microswitches. Next, the hand knob 246 is rotated until the reference mark 197 is aligned with the corresponding "pick" 492 of the seismogram recorded at shot point No. 1. Assuming that the reference mark 197 need be moved to the right to register with the selected "pick" 492, the hand knob 246 is rotated counterclockwise so that the spring motor 286 readily pulls the shuttle block 199 to the right by means of cable 284. Simultaneously, the shuttle block 266 will be moved to the right and the shuttle block 254 will be moved to the left. As the shuttle block 254 is moved to the left, the tension in cable 340 will be reduced so that the spring 357 will pull the switch lever 356 and spring cam 360 against the microswitch 364 which will close and energize the motor 156 in such a manner as to drive the reference shoe 50 downwardly relative to the arm 42. As the distance between the pivot point 46 and the end of the reference shoe 50 adjacent the arm 42 increases, both the arm 42 and the arm 44 will be pivoted or swung to the right by reason of the fact that the plotting shoe 50 is maintained at right angles to both arms 42 and 44 at all times. As the arms 42 and 44 pivot, the interconnecting rod 52 assists in maintaining the arms 42 and 44 parallel at all times. It will be appreciated that, although highly desirable, the interconnecting rod could be eliminated. Also, the more the arms pivot, the greater the force exerted by the cables 189 and spring motor 189a.

Should the reference mark 197 need be moved to the left, the hand knob 246 is turned clockwise to cause the proportionalizing lever 258 to pivot clockwise and pull the shuttle block 198 to the left by cable 278. This increases the tension in cable 340 in such a manner to close the microswitch 362 and thereby energize the motor 156 in such a manner to drive the plotting shoe 50 upwardly relative to the arm 42. In this case, both arms 42 and 44 would be pivoted to the left.

When the plotting shoe 50 has been positioned at a point corresponding to the position of the reflecting interface, the motor 136 is energized conveniently by the foot pedal switch which may be placed on the floor under the apparatus. As the cable 128 is first tensioned, the scribing pencil will be lowered into engagement with the worksheet on the easel. Then as the follow-up cable 129 becomes taut, the scribing carriage will be pulled from the position established by the cable 386 to the right to scribe a line on the worksheet. When the motor 136 is de-energized, the spring motor 142, acting through the cable 148 on the sheave 150, will return the scribing carriage 110 to the left against the spring 154. The motor 136 requires only about one second to pull the scribing carriage 110 from left to right so that the operator can easily hold the foot pedal switch closed until the stroke of the scribing carriage 110 is completed.

When the embodiment shown in FIG. 5C, including the motor 428, is used, the operator again scribes a line merely by pressing a conveniently located foot pedal actuated switch. When the switch is closed by the operator, the scribing motors 428 and 136a are simultaneously energized. The motor 136a immediately tensions the cable 128a and pulls the tab 124 and pencil 122 downwardly against the force of the spring 126 until the pencil engages the worksheet. Simultaneously, the motor 428 is started to rotate the disc 426. The microswitch 432, after a slight rotation of the disc 426, closes to maintain the motors 136a and 428 energized even though the foot pedal switch be released. As the disc 427 is rotated, the sheaves 421 and 408 are pulled to the left thereby pulling cable 386 to move the scribing carriage 110 to the right, and scribing a line from the original position of the scribing carriage, as previously set by positioning of slide 380, to the point adjacent the arm 44. The carriage 150 reaches its right-hand position after 180 degrees of rotation of the disc 426, and as the disc 426 continues around, the carriage 150 is returned to double mark the section. When the disc 426 has completed one revolution, the cam notch 433 in the disc 427 opens the microswitch 432 to de-energize both motors 136a and 428.

After the section for one pair of "picks," 490 and 492 for example, has been plotted, the reference carriage 190 is moved to the next set of "picks" and the procedure repeated. After all pairs of "picks" have been plotted from the two seismograms 450 and 451, for example, the reference carriage 190 is returned to the three-second orientation detent and locked in position. The record sheet 40 is then moved until the seismogram 451 is aligned under the left-hand reference mark 197 and the next successive seismogram 452 is aligned under the right-hand reference mark 192. The multiplication arm 258 is returned to the perpendicular position so that the two reference marks 192 and 197 are precisely perpendicular to the rail 30, and then the three-second reference line on the record sheet 40 is aligned under the two reference marks 192 and 197. The pointer 460 is set on the foot scale of the scale strip 454 to register with the distance d between the shot points Nos. 2 and 3 of the seismograms 451 and 452, respectively, to introduce the proper multiplication factor $D/d$. The corresponding inches on the scale strip 454 is marked from the second shot point reference mark previously scribed at the bottom of the worksheet to make a third reference mark. Next, the easel 14 is moved to the left to register the third reference mark with the right-hand pivot point reference mark 470. The slide 380 is also set to the corresponding distance in inches between the shot points Nos. 2 and 3 to properly position the scribing carriage 110. The reference carriage is then moved to the far left and the successive reflecting interfaces plotted in the same manner as previously described.

*Embodiment Shown in FIGS. 9 and 10*

The embodiment of the present invention indicated generally by the reference numeral 500 and schematically represented in FIGS. 9 and 10 operates in the same general manner as the plotting device 10. However, instead of approximating the curved paths of the seismic sound signals by straight lines, as is the case in the embodiment of FIGS. 1–8, the plotting apparatus 500 approximates the curved paths in accordance with the theory that the reflecting interface will lie tangent to an arc having a radius R (see FIG. 10) scribed about a point P which is a depth H vertically below the shot point. Although the ratio between the radius R and the depth H actually varies slightly from one locality to the next because it is a function of the rate at which the density changes with depth, as a practical matter it can be assumed that this ratio remains constant. The methods for computing the ratio between R and H are well known in the art and therefore will not be set out in detail, it being obvious that the best average ratio should be selected, or if desired, some means provided for conveniently adjusting the relative movements of the upper section and the plotting shoe, as will hereafter be apparent to those skilled in the art.

The plotting apparatus 500 (see FIG. 9) is comprised generally of a worksheet support frame or table 502 and a seismic time record or seismogram support table 504. The surfaces of the tables 502 and 504 may in actuality be a single horizontal table top, with a portion of the table extending along one edge serving as the seismogram support table 504 and the remainder as the worksheet support table 502.

A right-hand arm and a left-hand arm, indicated generally by the reference numerals 506 and 508, respectively are slidingly and pivotally mounted over the worksheet support area 502. The right-hand arm 506 is comprised of an upper section 510 which is slidingly supported in a bracket 512 and is pivotally connected to a lower section 514 at a pivot point 516 by any suitable pivot coupling. The bracket 512 is connected to the worksheet table 502 and maintains the upper section 510 of the right-hand arm 506 perpendicular to a zero time reference line 517 extending along the upper edge of the worksheet support table 502.

The left-hand arm 508 has an upper section 518 which is slidably retained within a left-hand bracket 520 and is pivotally connected to a lower section 522 at a pivot point 524 by any suitable pivot coupling. The bracket 520 is connected at a right angle to a sleeve bracket 526 which is slidable along a rail 528. The rail 528 is disposed parallel to the zero time reference line 517 so that the upper section 518 will be maintained perpendicular to the zero time reference line 517. Therefore the upper sections 510 and 518 are maintained in parallel relationship at all times. The sleeve bracket 526 may be set in any desired position along the rail 528 by a suitable set screw 530 to establish the proper spacing between the right and left-hand arms 506 and 508 for purposes hereafter explained.

A plotting shoe indicated generally by the reference numeral 532 extends between and interconnects the lower portions 514 and 522 of the right-hand and left-hand arms, respectively. The left-hand end of the plotting shoe 532 is rigidly fixed at a right angle to a sliding sleeve coupling 534. The sleeve coupling 534 encompasses and slides along the lower section 522, and thereby permits the left-hand end of the plotting shoe 532 to move along the lower section 522 of the left-hand arm 508. A coupling 536 slidingly conencts the right-hand end of the plotting shoe 532 to the lower section 514 of the right-hand arm 506. The coupling 536 comprises an upper sleeve portion 538, which slidingly receives the plotting shoe 532, and a lower sleeve portion 540, which slidingly receives the lower portion 514 of the arm 506. The upper and lower sleeves 538 and 540 are rigidly interconnected at right angles and thereby continuously maintain the plotting shoe 532 at a right angle to the lower portion 514 of the right-hand arm 506. Yet the coupling 536 permits the plotting shoe 532 to move upwardly and downwardly along the lower section 514, and also slide transversely over the lower section 514.

A right-hand servomechanism is indicated generally by the reference numeral 541 and moves the plotting shoe 532 along the lower section 514 of the right-hand arm and simultaneously moves the upper section 510 a proportionate distance relative to the bracket 512. The servomechanism 541 includes a servomotor 542 which is mounted on and connected to drive a gear box 544. The gear box 544 is mounted on the upper section 510 of the right-hand arm 506 and is geared to drive an upper threaded shaft 546 which extends from the gear box 544 parallel to the upper section 510. The upper threaded shaft 546 is threaded through a nut 548 which is connected to the worksheet support table 502. Therefore, when the upper shaft 546 is rotated, the upper section 510 will be moved upwardly or downwardly through the bracket 512. A lower threaded shaft 550 is disposed parallel to and extends the length of the lower section 514 of the right-hand arm 506. The lower threaded shaft 550 is driven by a gear box 552 mounted at the upper end of the lower section 514. The lower shaft 550 is journaled in a suitable bearing 554 at the lower end of the lower section 514. The threaded shaft 550 is threaded through a nut 556 which is rigidly connected to the coupling 536. Therefore, when the lower shaft 550 is rotated, the right-hand end of the plotting shoe 532 will be driven upwardly or downwardly along the lower section 514. A flexible drive cable 558 interconnects the gear box 544 and the gear box 552 and when the servomotor 542 is energized, simultaneously drives both threaded shafts 546 and 550 at a given speed ratio so that the upper section 510 will be moved a distance relative to the bracket 512, proportional to the distance the plotting shoe 532 is moved relative to the lower section 514, and in the same direction. In this manner the ratio of the distance between the pivot point 516 and the plotting shoe 532, which is the radius R, to the distance between the zero reference line 517 and the pivot point 516, which is the depth H, remains constant.

A left-hand servomechanism, indicated generally by the reference numeral 559, is substantially identical to the right-hand servomechanism 541 and drives the sleeve coupling 534, and therefore the left-hand end of the plotting shoe 532 along the lower section 522 of the left-hand arm 508 and simultaneously moves the upper section 518 a proportionate distance relative to the bracket 520. The left-hand servomechanism 559 is comprised of an electric servomotor 560 which is connected to drive an upper gear box 562 mounted on the upper section 518 of the left-hand arm 508. An upper threaded shaft 564 is driven by the upper gear box 562 is threaded in a nut 566 which is connected to the sleeve coupling 526. A lower threaded shaft 568 is driven by a lower gear box 570 mounted on the upper end of the lower section 522 and is journaled in a bearing 572 connected to the lower end of the lower section 522 of the left-hand arm 508. A flexible drive cable 574 interconnects the upper gear box 562 and the lower gear box 570 to drive the lower threaded shaft 568. The lower threaded shaft 568 is threaded through a nut 576 which is rigidly connected to the plotting shoe 532. Therefore, when the servomotor 560 is driven, both the upper and lower threaded shafts 564 and 568 will be rotated at a proportional speed to simultaneously move the upper section 518 of the left-hand arm 508 through the sliding sleeve bracket 520 by action against the fixed position nut 566, and to move the plotting shoe 532 along the lower section 522 of the left-hand arm 508 by action against the nut 576 which is connected to the left-hand end of the plotting shoe 532.

A reference carriage 580 slides along a rail 581 which is disposed along one edge of the time record support table 504. The reference carriage has a left-hand reference mark 582 which is in fixed position on the reference carriage 580 and may comprise a tubular pivot for a dip reference arm 583. The tubular pivot may be provided with cross-hairs (not shown) to provide a precise reference mark. The dip reference arm 583 is preferably fabricated of a transparent plastic material and is provided with a right-hand reference mark 584 which is scribed along the axis of the arm 583. The dip reference arm 583 extends over the record support table 504 and the transparent plastic material permits an operator to view a seismogram sheet 634 placed on the record support table 504 as hereafter described.

A left-hand flexible control cable 585 for controlling the left-hand servomechanism in response to the position of the left-hand reference mark 582 is connected to the reference carriage 580 at a point in line with pivot point 582. Cable 585 passes through a tension control switch 586, around a sheave 588, which is journaled on the support structure of the apparatus 500, and around a sheave 590 which is journaled on the sleeve bracket 526. The cable 585 then extends parallel to the upper section 518 of the left-hand arm, passes directly over the pivot point 524, and extends parallel to the lower section 522 of the left-hand arm 508 and is connected to the left-hand end of the plotting shoe 532 at point 589. A spring motor 591 is mounted on the rail 581 and is connected by a cable 592 to the reference carriage 580. The spring motor 591 exerts a constant force on the carriage 580 and thereby maintains a neutral tension in the cable 585, to maintain proper operation of the tension switch 586 as hereafter described.

The switch 586 may be similar to the tension switches 301 and 353 described in connection with the apparatus of FIG. 1 and shown in detail in FIG. 5B. When the tension in the left-hand control cable 585 is increased above the neutral tension caused by the spring motor 591 by manual movement of the reference carriage 580, the tension switch 586 will be closed in such a manner as to connect a suitable power supply 593 to the servomotor 560. The servomotor 560 will then be energized in such a manner as to drive the threaded shafts 564 and 568 in a direction to move the plotting shoe 532 upwardly along the lower section 522, and to move the upper section 518 upwardly with respect to the bracket 520, to thereby decease the tension in the cable 585 back to the neutral value which will open the tension switch 586. Similarly, when the tension in the cable 585 is reduced below the neutral tension caused by the spring motor 591 by manual movement of the reference carriage, the switch 586 will be closed to energize the motor 560 in the reverse direction and drive the upper section 518 downwardly relative to the bracket 520 and the plotting shoe 532 downwardly along the lower section 542 of the left-hand arm 508, until the tension in the left-hand control cable 585 is increased back to the neutral tension to again open the tension switch 586.

The control system for the right-hand servomechanism includes a right-hand control cable 594 which is tensioned to a constant value by a spring motor 596 which is connected to the rail 581. The cable 594 passes around a sheave 598, which is journaled on the reference carriage 580, and is connected to the reference dip arm 583 at point 602. The right-hand control cable 594 then passes around a second sheave 604 which is also journaled on the reference carriage 580. The cable 594 next passes through a tension switch 605 which is identical to the tension switch 586. The cable 594 then passes around a sheave 606, which is journaled on the rail 581, and then around a second sheave 608 which is journaled on the worksheet support table 502. The control cable 594 then extends parallel to the upper section 510 of the right-hand arm 506 and passes over the pivot point 516. The cable 594 then extends parallel to the lower section 514 of the arm 506 and is connected to the sliding coupling 536 at point 610.

The tension switch 605 controls operation of the servomotor 542 on the right-hand arm in the same manner that the tension switch 586 controls operation of the servomotor 560. When the tension in the control cable 594 increases beyond that neutral tension applied by the spring motor 596, the tension switch 605 will close and energize the servomotor 542 in such a manner as to drive the threaded shafts 546 and 550 in a direction to move the upper section 510 upwardly and to simultaneously move the reference shoe 532 by means of the coupling 536 upwardly along the lower section 514, until the tension in the cable 594 is decreased to the neutral value imposed by the spring motor 596. The switch 605 will then be opened to stop operation of the servomotor 542. Conversely, when the tenison in the control cable 594 is reduced, the switch 605 will energize the motor 542 in such a manner as to move both the upper section 510 and the plotting shoe 532 downwardly to decrease the tension in the cable 594 back to the neutral value which opens the switch 605.

The plotting shoe 532 is provided with a scribing pencil 624 which is slidable along a slot 626. A suitable servomotor 627 is mounted on the plotting shoe 532 and is connected by a flexible cable 628 to pull the scribing pencil 624 along the plotting shoe 532 upon actuation of the servomotor 626. The servo means also include some provision for lowering the scribing pencil 624 into engagement with a worksheet positioned on the support surface 502 as desired. A suitable spring device (not shown) may be provided for returning the scribing pencil 624 back to the right-hand position shown after the motor 626 has been de-energized. The motor 526 is preferably energized at the will of an operator by a foot pedal switch 630.

*Operation of Embodiment Shown in FIGURES 9 and 10*

The operation of the embodiment shown in FIGS. 9 and 10 is fundamentally the same as the operation of the embodiment shown in FIGURES 1–8. A worksheet is placed on the worksheet support table 502. The worksheet may have horizontally extending, vertically spaced lines for orientation and reference purposes, as previously described in connection with the plotting apparatus 10. A record sheet 634 having a series of seismogram near-time traces 636, 637, 638, for example, is placed on the record support table 504 with the zero line in registration with the zero reference line 640. It will be noted that the zero time line of the several seismogram traces are placed inverted to the zero time line 517 as can be seen by reference to FIGURE 9. Both the worksheet and the record sheet 634 may conveniently be oriented by the same procedure as described in connection with the embodiment of FIGURES 1–8, in that the reference carriage 580 may be locked by a reference detent at the three-second time line, for example, and the three-second time line of the record sheet 634 oriented under the reference line 584 on the reference carriage 580. In this position the scribing pencil 624 of the plotting shoe 532 should mark a line precisely on the three-second time reference line on the worksheet.

Next the sleeve bracket 526 is moved along the rail 528 until the distance between the vertically depending portions of control cables 585 and 594 is equal to the scaler distance between shot points Nos. 1 and 2. In this connection, it will be noted that the control cable 585 and 594 represent the center lines of the left-hand arm 508 and the right-hand arm 506, respectively. When the sleeve bracket 526 is in the proper position, the hand screw 530 is tightened to securely clamp the bracket 526 in place. It will be noted that since the sleeve bracket 526 is movable along the rail 528, the length of the control cable 585 between the reference carriage 580 and the plotting shoe 532 will be varied with each separate setting of the sleeve bracket 526. Therefore, the connection of the cable 585 to the reference carriage 580 is preferably made adjustable so that the length of the control cable 585 may be adjusted for each setting of the bracket 526. Then, with the reference carriage in the three-second reference detent, the plotting shoe 532 can be positioned so that the pencil 624 will scribe a line directly on the three-second time reference line of the worksheet 502.

After the lengths of the control cables 585 and 594 have been properly adjusted so that a plotting shoe 532 positions the scribing pencil 624 along the proper reference line, the reference carriage 580 is moved downwardly until the reference mark 582 coincides with a "pick" 640, for example, on the seismogram 636 taken at the No. 1 shot point. Upon manual movement of the reference carriage 580, the tension in both control cables 585 and 594 will be increased so that the left-hand and right-hand servomechanisms 559 and 541, respectively, will both be energized in such a manner as to drive the plotting shoe 532 upwardly and simultaneously move the upper sections 518 and 510, respectively, upwardly relative to the rail 528 until the plotting shoe 532 is at the proper depth. Then the dip reference arm 583 is pivoted until the right-hand reference mark 584 coincides with the "pick" 642 on the seismogram 637 recorded at shot point No. 2.

As the dip reference arm 583 is pivoted, the tension in the right-hand control cable 594 will either be increased or decreased, as the case may be, to actuate the servomechanism 541 to change the position of the upper section 510 relative to the bracket 512, and to simultaneously change the position of the coupling 536 relative to the lower section 514, a proportionate distance in the same direction. If the dip reference arm 583 is pivoted in the counterclockwise direction, it will be noted that the tension in the control cable 594 will be increased so that both the upper section 510 and the plotting shoe 532 will be moved upwardly to cause the two lower sections 514 and 522 to pivot clockwise or swing to the right as indicated in FIG. 9. Both the movement of the upper section 510 relative to the zero time reference line 517 and the movement of the plotting shoe 532 along the lower section 514 causes this pivotal movement because a 90 degree angle is maintained between the plotting shoe 532 and each of the lower sections 514 and 522. Of course, should the dip reference arm 583 be pivoted clockwise, the plotting shoe 532 would be driven downwardly along the lower section 514 and the upper section 510 would be driven downwardly relative to the bracket 512 to cause the lower sections of the arms to swing to the left or pivot clockwise.

After the reference shoe 532 is properly oriented, the operator presses the foot pedal switch to energize the motor 627 which lowers the scribing pencil 624 into engagement with the worksheet and also moves the scribing pencil from right to left, thereby scribing a line representative of the reflecting interface. In this connection, it will be noted that the scribing pencil 624 is automatically positioned to scribe a line of proper length. When the distance between the arms is adjusted by movement of the sleeve bracket 526, the sleeve coupling 538 permits the lower sections 514 and 522 to move together a corresponding amount, and the coupling 536 will therefore move the scribing pencil 624 to the left a corresponding amount. Also, as the lower sections 514 and 522 are pivoted to either side, the lower sections will remain parallel so that the plotting shoe 532 will slide through the sleeve coupling 538 as the lower section moves closer together, and the scribing pencil 624 will consequently be moved further to the left to decrease the length of the line which will be scribed. Therefore it will be noted that the distance between the control cables 594 and 585 adjacent the plotting shoe 532 will at all times correspond to the scalar length of the reflecting interface section which can properly be plotted by the two seismograms taken at shot points Nos. 1 and 2 as can be seen in FIG. 10.

After the interface sections between the seismograms 636 and 637 have been plotted, the worksheet on the worksheet support table 502 is moved to the left a scalar distance equal to the distance between shot point No. 2 and shot point No. 3, as represented by seismogram 638, so that the No. 2 shot point which did register with the right-hand control cable 594 or arm 506 will be aligned under the left-hand control cable 585, and shot point No. 3 will be positioned under the right-hand control cable 594. Of course, the sleeve bracket 526 must again be adjusted to the proper spacing between the two control cables 585 and 594, and the length of the control cable 585 must again be adjusted to properly orient the plotting shoe 626. The record sheet 634 is then moved so that the seismogram 637 is placed under the left-hand reference marked 582 and the plotting procedure is repeated to plot the interface sections between shot point Nos. 2 and 3.

Summary

From the above detailed description of two embodiments of the invention, it will be evident that plotting devices have been described which will, with acceptable accuracies, automatically locate and plot the true depth, displacement and dip of a reflecting interface directly from seismographic time records. The direct compilation eliminates both the tedious compilation and complicated calculations previously required, so that the plotting procedure is greatly expedited and the frequent occurrence of human error is greatly reduced. Both embodiments of the invention herein described utilize a novel and simple servo system for taking seismographic time data directly from a seismogram trace in order to position a plotting shoe and thereby locate the true position of a reflecting interface. The servo systems are highly accurate by reason of the fact that the uniform "neutral" tension in the control cables establishes a precise measuring condition by which the plotting shoe can be located with great precision.

The embodiment of FIGURES 1–8 is a particularly advanced design for plotting displaced interface sections and has many refinements which contribute to the accuracy and convenience of operation which will be readily evident to those skilled in the art.

In the embodiment of FIG. 1, the worksheet is supported on the easel 14 in a substantially upright manner which is easily visible to the operator and can be easily reached by the operator for any marking which may be required on the worksheet. Also, the easel 14 is easily moved in the horizontal direction relative to the arms 42 and 44 so that sections of interfaces between successive shot points of a series can easily be plotted. The pivoted arms are of light-weight construction and the servomechanism motors 156 and 180 are supported directly on the pivot brackets of the arms so as not to contribute their relatively large weight on the arms. Since the pivot points 46 and 48 of the arms are spaced a fixed distance apart, the need for repeated adjustment between the pivot points to correspond to the distance between the respective shot points is eliminated. Also, this construction permits a reinforcing spacer bar 52 which forms a parallelogram with the arms and thereby assists in maintaining the arms parallel at all times. The cables 189a assist in supporting the arms when they are swung excessively to either side so as to prevent distortion of the arms due to their weight which would introduce error to the plot and also cause excessive wear on the apparatus.

The record sheet 40 is supported on a novel record support section 12 which permits easy handling of the large sheet of paper. Further, the record support table is preferably supported waist high along the lower edge of the worksheet on the easel 14 which greatly facilitates ease of operation. The novel reference carriage 190 is easily moveable along the support rails 28 and 30 because upon application of slight pressure to close the tension switches 301 and 353, the servomechanisms will move the carriage 190 so long as the pressure is maintained. The right-hand reference mark 192 is adjustably connected to the reference carriage 190 which permits the reference mark to be adjusted transversely of the record sheet for easy registration with any desired seismogram on the record sheet. The positioning of the left-hand reference mark 197 is easily and accurately accomplished by means of the hand knob 246. Similarly, the various spacing between the two shot points of the two seismograms being plotted is easily and quickly compensated for merely by twisting the hand knob 236 to set the pointer 460 on the corresponding foot scale of the scale strip 454. The scale strip 454 provides an immediate conversion between the spacing in feet between the shot points to the corresponding scalar time distance in inches so that the worksheet can be quickly positioned relative to the right-hand arm 44 for each successive set of shot points. The scribing mechanism, including the scribing carriage 110, provides a means for remotely scribing a line representing the interface section of the proper scalar length.

The embodiment described in FIGS. 9 and 10, shows an apparatus using the principles of the present invention for locating reflecting interfaces in accordance with the curved path theory. In addition to the novel mechanical apparatus for approximating the curved path, the embodiment of FIGS. 9 and 10 also illustrates the principles by which the spacing between the pivoted arms can be adjusted to compensate for differences in the spacing between successive shot points. In this connection, it will be evident that the brackets 512 and 520 could be maintained at fixed points to provide a fixed spacing and the reference cariage 190 of the embodiment of FIGS. 1–8 used to introduce a compensation factor to the distance the right-hand end of the plotting shoe 532 is moved relative to the zero reference line 517. Conversely, it will be apparent to those skilled in the art, that the plotting apparatus 10 which approximates the path of the seismic signals by straight lines could be modified by providing means for varying the scalar spacing between the pivot points 46 and 48 in accordance with the scalar spacing between the shot points. Another example of changes which can easily be incorporated in the embodiments described by persons skilled in the art would be a pulley arrangement in the cable 585 (see FIG. 9) which would permit the sleeve bracket 526 to be moved along the rail 528 without adjustment of the length of the cable 585 as described. This pulley arrangement could include a loop in the cable 585 and a number of pulleys aranged to utilize the principle of the pulleys 346, 348 and 350 (see FIG. 5A) which permit the rail 224 to move transversely of the reference carriage 190 without affecting the length of the cable 340.

Therefore, it is understood that various changes in structure and in the combinations of the novel features can be made in the above described embodiments without departing from the spirit and scope of my invention as defined by the appended claims.

I claim:

1. Apparatus for automatically plotting the depth, displacement and dip of subsurface interfaces from seismograms recorded at two spaced shot points comprising:
   a work surface frame for supporting a work-sheet upon which the reflecting interfaces are to be graphically plotted;
   first and second arms extending over the work surface frame and pivotally connected thereto;

a plotting shoe extending between the first and second arms;

the plotting shoe having coupling means interconnecting the plotting shoe and the arms for permitting the plotting shoe to move along the arms and for maintaining the plotting shoe at right angles to the arms;

elongated support means for supporting a pair of seismograms having seismic event time marks thereon;

first and second reference marks moveable relative to the support means for registration with the respective seismic event time marks; and first and second servo systems operatively connected to said first and said second reference marks, respectively, said first and second servo systems adapted for driving the plotting shoe to positions on the first and second arms corresponding to the positions of the first and second reference marks, respectively, on the elongated support means, whereby the true location and dip of the reflecting subsurface strata will be automatically located by the position of the plotting shoe.

2. Apparatus for automatically plotting the depth, displacement and dip of subsurface interfaces from seismograms recorded at two spaced shot points as defined in claim 1 wherein the first and second servo systems comprise:

first and second flexible members moveable responsive to movement of first and second reference marks and extending from the respective reference marks to the opposite ends of the plotting shoe adjacent the first and second arms respectively;

first and second electric servo means for driving the plotting shoe along the first and second arms, respectively;

first and second switch means responsive to an increase in tension in the first and second flexible members, respectively, for energizing the respective electric servo means for moving the plotting shoe in a direction along the respective arms to reduce the tension in the respective flexible member, and responsive to a reduction in tension in the first and second flexible members, respectively, for starting the respective electric motor and moving the plotting shoe in the other direction along the respective arm to increase the tension in the respective flexible member.

3. Apparatus for automatically plotting the depth, displacement and dip of subsurface interfaces from seismograms recorded at two spaced shot points as defined in claim 1 wherein:

the first and second arms are pivotally connected to the work surface frame at spaced and fixed pivot points, and the first and second servo systems include a means for compensating for variations in the distance between pairs of shot points of the particular seismograms being used to plot the location and dip of the subsurface interfaces.

4. Apparatus for automatically plotting the depth, displacement and dip of subsurface interfaces from seismograms recorded at two spaced shot points as defined in claim 1 wherein:

the first and second arms are pivotally connected to the work surface frame by pivot means which are adjustable to vary the spacing between the pivot means and thereby compensate for variations in the distance between the shot points of the seismograms being plotted.

5. Apparatus for automatically plotting the depth, displacement and dip of subsurface interfaces from seismograms recorded at two spaced shot points as defined in claim 1 wherein:

the first and second arms are pivotally connected to the work surface frame by first and second upper sections, respectively, the first and second upper sections being maintained in parallel relationship and being moveable longitudinally relative to the work surface frame; and, the first and second servo means are further characterized by means for moving the first and second upper sections, respectively, a distance relative to the work surface frame proportional to the distance the plotting shoe is moved relative to the respective first and second arms whereby the plotting shoe will be positioned approximately in accordance with the curved path theory of seismic wave propagation and reflection.

6. Apparatus for automatically plotting the depth, displacement and dip of subsurface interfaces from seismograms recorded at two spaced shot points as defined in claim 5 wherein:

the spacing between the first and second upper sections is adjustable to compensate for variations in the distance between the two shot points of the seismograms being plotted.

7. Apparatus for automatically plotting the depth, displacement and dip of subsurface interfaces from seismograms recorded at two spaced shot points as defined in claim 1 wherein:

the work surface frame for supporting a worksheet is further characterized by a support frame and a worksheet support easel moveable therealong, the easel being moveable in a direction generally transverse to the first and second arms whereby a worksheet carried by the easel will be moveable in the graphically horizontal direction for plotting seismograms recorded at successive shot points along the surface of the earth.

8. Apparatus for automatically plotting the depth, displacement and dip of subsurface interfaces from seismograms recorded at two spaced shot points as defined in claim 7 wherein:

the support frame supports the worksheet support easel at an angle to the horizontal; and the elongated support means is disposed in a horizontal plane adjacent the lower edge of the worksheet support easel.

9. Apparatus for automatically plotting the depth, displacement and dip of subsurface interfaces from seismograms recorded at two spaced shot points as defined in claim 2 further characterized by:

a reference carriage moveable over the seismographic record, and wherein both the first and second reference marks are connected to the reference carriage, the first reference mark being fixed to the carriage and the second reference mark being moveably connected to the carriage for movement relative thereto in the same direction that the carriage is moveable relative to the elongated support surface, whereby both reference marks can be simultaneously moved to position the plotting shoe at the proper depth and the second reference mark can be moved to establish the displacement and dip of the interface being plotted.

10. Apparatus for automatically plotting the depth, displacement and dip of subsurface interfaces from seismograms recorded at two spaced shot points as defined in claim 9 wherein the reference carriage is further characterized by correction means for introducing a correction factor when the scalar distance between the two shot points is other than the scalar distance between the pivot points of the arms, the correction means comprising:

a multiplication lever pivotally supported at a pivot point on the reference carriage;

first linkage means interconnecting the second reference mark and the multiplication lever;

second linkage means interconnecting the multiplication lever and the flexible member of the second servo means;

the distance from the pivot point of the lever to the point at which the first linkage means is connected to the lever being always proportional to the distance from the pivot of the lever to the point at which the second linkage means is connected to the lever during pivotal movement of the lever; and, at least one of the points at which the first and second linkage means is connected to the lever being adjustable relative to the pivot point of the multiplication lever.

11. Apparatus for automatically plotting the depth, displacement and dip of subsurface interfaces from seismograms recorded at two spaced shot points as defined in claim 10 wherein:

the correction means is further characterized by first and second tracks disposed in parallel relationship and at an angle to the multiplication lever;

the first linkage means comprises a first shuttle block slidable along the first track and means interconnecting the second reference mark and the first shuttle block, the first shuttle block being slidingly connected to the multiplication lever;

the second linkage means comprises a second shuttle block slidably along the second track, and means interconnecting the flexible member of the second servo means and the second shuttle block, the second shuttle block being slidably connected to the multiplication lever; and, at least one of the first and second tracks being moveable relative to the pivot point of the multiplication lever.

12. Apparatus for automatically plotting the depth, displacement and dip of subsurface interfaces from seismograms recorded at two spaced shot points as defined in claim 1 wherein:

the first and second arms are each comprised of an elongated tubular arm member having a longitudinally extending slot therein;

the plotting shoe is comprised of an elongated tube having a longitudinally extending slot therein;

the coupling means connecting the plotting shoe to one of the arms comprises an elongated plug slidably received in the tubular arm member and rigidly connected to the plotting shoe at a right angle by a pin extending through the longitudinally extending slot in the tubular arm member; and, the coupling means connecting the plotting shoe to the other of the arms comprises a second elongated plug slidably received in the respective tubular arm member, a third elongated plug slidably received in the elongated tube of the plotting shoe, and a pin extending through the slot in the respective tubular arm member and the slot in the elongated tube of the plotting shoe and rigidly interconnecting the second and third plugs at a right angle.

13. Apparatus for automatically plotting the depth, displacement and dip of subsurface interfaces from seismograms recorded at two spaced shot points comprising:

a worksheet support surface;

a first arm extending over the worksheet support surface and having a first lower section pivotally connected to a first upper section;

a second arm extending over the worksheet support surface and having a second lower section pivotally connected to a second upper section;

first and second bracket means connected to the worksheet support surface and disposed on a reference line for slidably connecting the first and second upper sections, respectively, to the worksheet support surface and for maintaining the upper sections in parallel relationship;

a plotting shoe extending between and slidably connected to the first and second lower sections, the plotting shoe being maintained at right angles to the lower sections;

a first electric servomechanism for simultaneously moving the plotting shoe along the first lower section, and the first upper section relative to the worksheet support surface proportionate distances in the same general direction;

a second electric servomechanism for simultaneously moving the plotting shoe along the second lower section, and the second upper section relative to the worksheet support surface proportionate distances in the same general direction;

a seismogram support surface;

first and second reference marks moveable over the seismogram support surface for registration with seismogram time marks;

first control means for energizing the first electric servomechanism for moving the plotting shoe along the first arm to a position relative to the reference line corresponding to the position of the first reference mark over the seismogram support surface; and second control means for energizing the second electric servomechanism for moving the plotting shoe along the second arm to a position relative to the reference line corresponding to the position of the second reference mark over the seismogram support surface, means for operatively connecting said first and second reference marks to said first and second control means, respectively whereby the plotting shoe will be automatically moved to a position corresponding to the location of the reflecting interface.

14. Apparatus for automatically plotting the depth, displacement and dip of subsurface interfaces from seismograms recorded at two spaced shot points as defined in claim 13 wherein each of the first and second electric servomechanisms is comprised of:

an upper gear box connected to the respective upper section;

an electric motor connected to drive the upper gear box;

an upper threaded rod driven by the upper gear box and extending parallel to the respective upper section;

an upper nut connected to the respective bracket means, the upper threaded rod being threaded through the upper nut;

a lower gear box connected to the respective lower section;

a lower threaded rod driven by the lower gear box and extending parallel to the respective lower section;

a lower nut connected to the respective end of the plotting shoe, the lower threaded rod being threaded through the lower nut; and, a flexible drive cable driven by the upper gear box and connected to drive the lower gear box and therefore the lower threaded rod, whereby when the respective electric motor is energized the respective upper and lower threaded rods will be rotated and the respective upper section will be moved relative to the reference line and the respective end of the plotting shoe will be moved relative to the respective lower section.

15. Apparatus for automatically plotting the depth, displacement and dip of subsurface interfaces from seismograms recorded at two spaced shot points as defined in claim 1 further characterized by:

scribing means mounted on the plotting shoe for scribing a line on a worksheet placed on the work surface frame corresponding to the position of the plotting shoe; and, servo means for remotely actuating the scribing means to scribe a line on the worksheet, whereby the position of the plotting shoe can be plotted on the worksheet by an operator located at a remote position.

16. Apparatus for automatically plotting the depth, displacement and dip of subsurface interfaces from seismograms recorded at two spaced shot points as defined in claim 15 further characterized by:

means for prepositioning the scribing means at a point on the plotting shoe such that a line of a length corresponding to the true length of interface section which can accurately be plotted from data acquired at two shot points will be scribed upon actuation of the servo means.

17. Apparatus for automatically plotting the depth, displacement and dip of subsurface interfaces from seismograms recorded at two spaced shot points as defined in claim 16 wherein the means for prepositioning the scribing means is further characterized by:

means for automatically positioning the scribing means on the plotting shoe as the arms are pivotally moved to compensate for the shortened interface section which can accurately be plotted from data acquired at two shot points as the dip of the interface increases.

References Cited in the file of this patent

UNITED STATES PATENTS

| | | |
|---|---|---|
| 2,535,220 | McGuckin | Dec. 26, 1950 |
| 2,716,521 | Brown | Aug. 30, 1955 |
| 2,864,167 | Hall | Dec. 16, 1958 |
| 2,880,510 | Sisson | Apr. 7, 1959 |

FOREIGN PATENTS

| | | |
|---|---|---|
| 123,174 | Australia | Dec. 18, 1946 |
| 935,158 | Germany | Nov. 10, 1955 |